(12) United States Patent
Lee et al.

(10) Patent No.: US 10,687,285 B2
(45) Date of Patent: Jun. 16, 2020

(54) CONTROL CHANNEL AND DATA CHANNEL POWER ALLOCATION AMONG MULTIPLE USER EQUIPMENT

(71) Applicant: INDUSTRIAL TECHNOLOGY RESEARCH INSTITUTE, Hsinchu (TW)

(72) Inventors: Chien-Min Lee, New Taipei (TW); Tzu-Ming Lin, Zhubei (TW); Keng-Te Liao, New Taipei (TW); Chia-Han Lee, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 424 days.

(21) Appl. No.: 14/981,513

(22) Filed: Dec. 28, 2015

(65) Prior Publication Data

US 2016/0323862 A1 Nov. 3, 2016

Related U.S. Application Data

(60) Provisional application No. 62/154,729, filed on Apr. 30, 2015.

(51) Int. Cl.
*H04W 52/32* (2009.01)
*H04L 5/00* (2006.01)
*H04W 52/34* (2009.01)

(52) U.S. Cl.
CPC ......... *H04W 52/325* (2013.01); *H04L 5/0044* (2013.01); *H04L 5/0053* (2013.01); *H04L 5/0092* (2013.01); *H04W 52/346* (2013.01)

(58) Field of Classification Search
CPC ... H04W 52/325; H04W 52/30; H04W 52/32; H04W 52/34; H04W 52/343; H04W 52/346; H04W 52/42; H04L 5/0044; H04L 5/0053; H04L 5/0092
See application file for complete search history.

(56) References Cited

U.S. PATENT DOCUMENTS 8,085,819 B2 12/2011 Kiran et al.
8,553,595 B2 10/2013 Laroia et al.
(Continued)

FOREIGN PATENT DOCUMENTS

CN 101741432 A 6/2010
CN 104322129 A 1/2015
(Continued)

OTHER PUBLICATIONS

Anass Benjebbour et al., "Concept and Practical Considerations of Non-orthogonal Multiple Access (NOMA) for Future Radio Access", 2013 International Symposium on Intelligent Signal Processing and Communications Systems (ISPACS), pp. 770-774, Nov. 12-15, 2013.
(Continued)

*Primary Examiner* — Ricky Q Ngo
*Assistant Examiner* — Stephen M Steiner
(74) *Attorney, Agent, or Firm* — Rabin & Berdo, P.C.

(57) ABSTRACT

A transmitting method, a transmitter, a receiver and an associated scheduling method for control signal and data signal are provided. The transmitting method includes following steps. Firstly, a first control power and a first data power are respectively allocated to a first control signal and a first data signal which are to be transmitted with a first sub-carrier in a first time duration. The first control power and the first data power are different. The first control signal and the first data signal are multiplexed by superimposing the first control power and the first data power before the multiplexed first control signal and the multiplexed first data signal are transmitted.

16 Claims, 21 Drawing Sheets

(56) References Cited

U.S. PATENT DOCUMENTS

| | | | |
|---|---|---|---|
| 8,565,170 | B2 | 10/2013 | Zhang et al. |
| 8,743,861 | B2 | 6/2014 | Damnjanovic et al. |
| 8,817,769 | B2 | 8/2014 | Palanki et al. |
| 2010/0189093 | A1* | 7/2010 | Palanki ............... H04W 52/16 370/344 |
| 2012/0034864 | A1 | 2/2012 | Lu et al. |
| 2013/0324182 | A1 | 12/2013 | Deng et al. |
| 2014/0192734 | A1* | 7/2014 | Ng ............... H04L 5/0035 370/329 |
| 2014/0269597 | A1* | 9/2014 | Park ............... H04J 11/005 370/329 |
| 2015/0009952 | A1 | 1/2015 | Berggren et al. |
| 2015/0098421 | A1* | 4/2015 | Barbieri ............... H04W 72/042 370/329 |
| 2015/0358064 | A1* | 12/2015 | Benjebbour ......... H04B 7/0452 370/329 |
| 2016/0366007 | A1* | 12/2016 | Hwang ............... H04L 27/3809 |
| 2017/0055230 | A1* | 2/2017 | Johansson ............ H04W 52/325 |

FOREIGN PATENT DOCUMENTS

| | | |
|---|---|---|
| TW | 201406180 A | 2/2014 |
| TW | I430689 B | 3/2014 |
| TW | I475917 | 3/2015 |

OTHER PUBLICATIONS

Jinho Choi, "Minimum Power Multicast Beamforming With Superposition Coding for Multiresolution Broadcast and Application to NOMA Systems", IEEE Transactions on Communications, vol. 63, No. 3, Mar. 2015.

Joerg Schaepperle, "Throughput of a Wireless Cell Using Superposition Based Multiple-Access with Optimized Scheduling", 2010 IEEE 21st International Symposium on Personal Indoor and Mobile Radio Communications (PIMRC), pp. 212-217, Sep. 26-30, 2010.

Nagisa Otao et al., "Performance of Non-orthogonal Access with SIC in Cellular Downlink Using Proportional Fair-Based Resource Allocation", 2012 International Symposium on Wireless Communication Systems (ISWCS), pp. 476-480, Aug. 28-31, 2012.

Sigen Ye et al., "Enhanced Physical Downlink Control Channel in LTE Advanced Release 11", IEEE Communications Magazine, vol. 51, Issue 2, pp. 82-89, Feb. 2013.

Anup K. Talukdar, "Performance Evaluation of the Enhanced Physical Downlink Control Channel in a LTE Network", 2013 IEEE 24th International Symposium on Personal, Indoor and Mobile Radio Communications, pp. 987-991, Sep. 8-11, 2013.

Taiwanese Office Action dated Apr. 19, 2017.

* cited by examiner

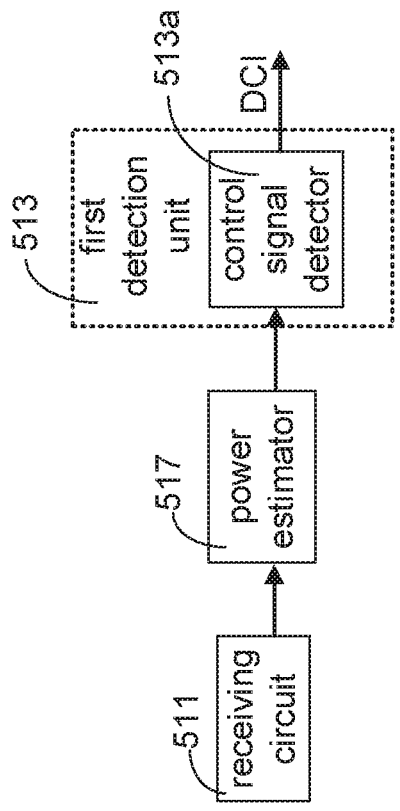
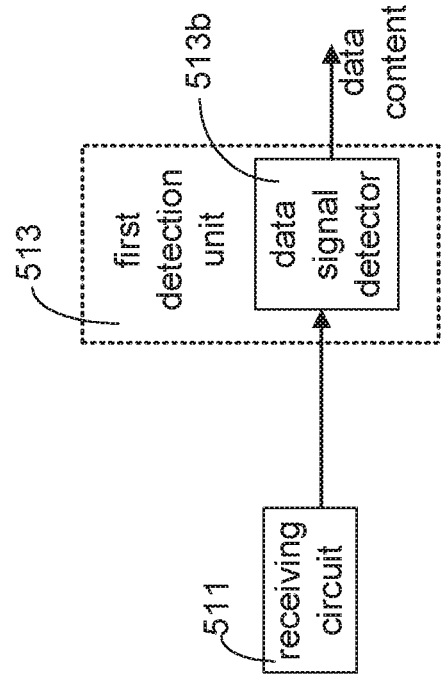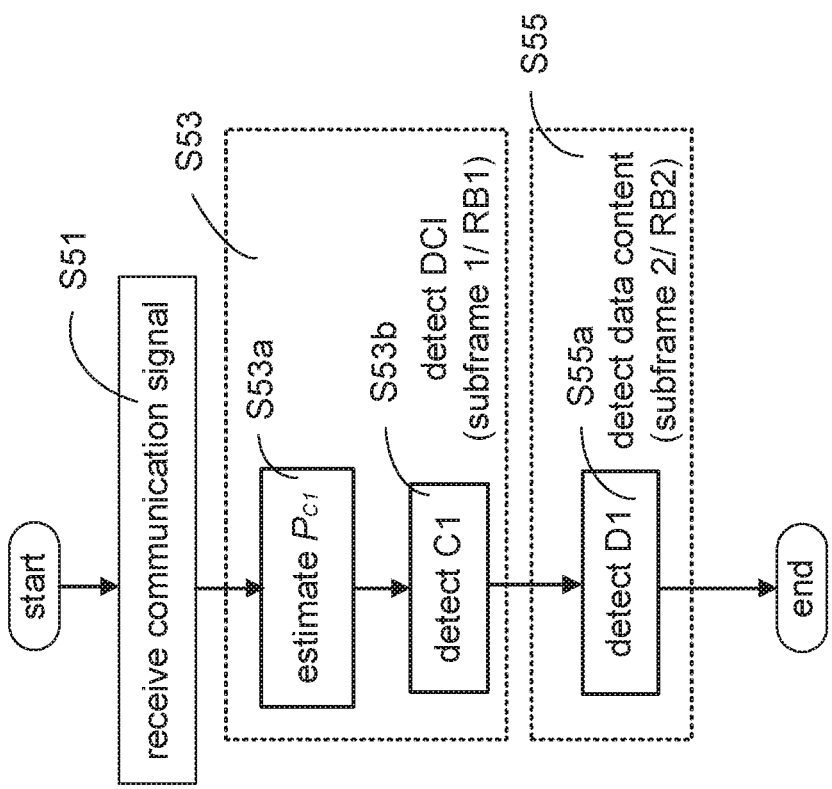
FIG. 11B
FIG. 11C
FIG. 11A

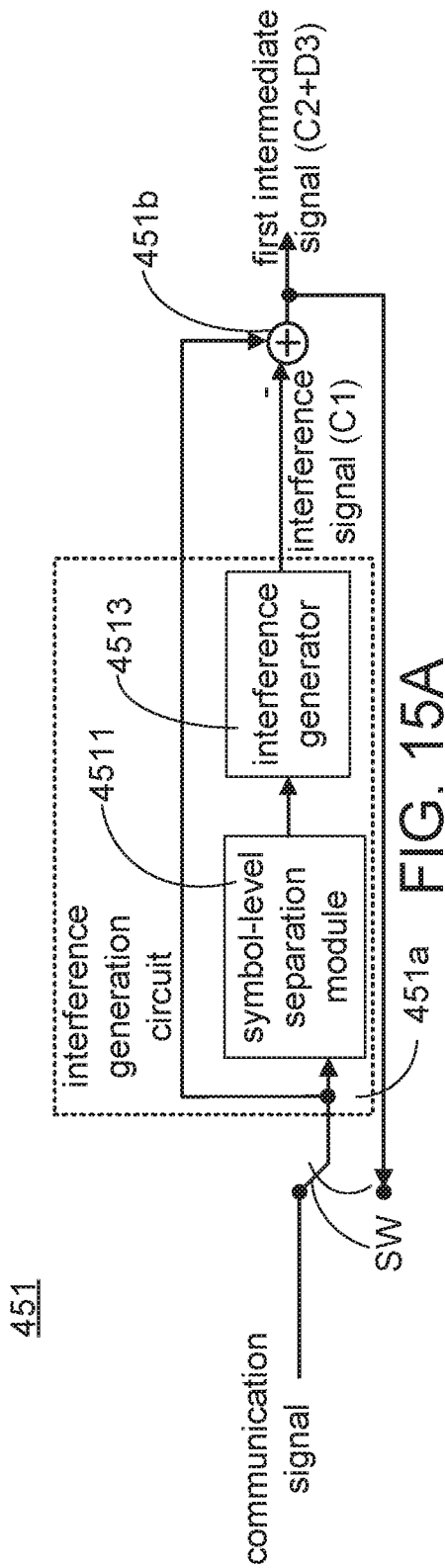
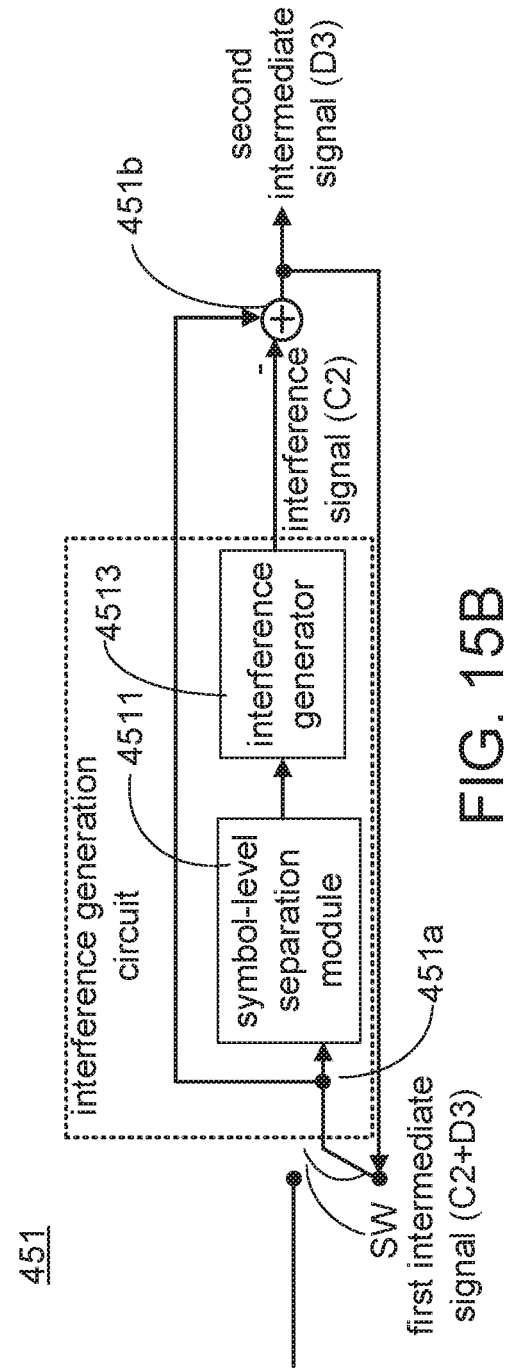
FIG. 15A
FIG. 15B

CONTROL CHANNEL AND DATA CHANNEL POWER ALLOCATION AMONG MULTIPLE USER EQUIPMENT

CROSS-REFERENCE TO RELATED APPLICATION

This application claims the benefit of U.S. provisional patent application No. 62/154,729, filed Apr. 30, 2015, the disclosure of which is incorporated by reference herein in its entirety.

TECHNICAL FIELD

The disclosure relates to a method for transmitting signals, a transmitter, a receiver and an associated scheduling method.

BACKGROUND

As used herein, the terms "user equipment" and "UE" in some cases might refer to mobile devices such as mobile telephones, personal digital assistants, handheld or laptop computers, and similar devices that have telecommunications capabilities. A UE might include a device and its associated removable memory module, such as but not limited to a Universal Integrated Circuit Card (hereinafter, UICC) that includes a Subscriber Identity Module (hereinafter, SIM) application, a Universal Subscriber Identity Module (hereinafter, USIM) application, or a Removable User Identity Module (hereinafter, R-UIM) application. Alternately, such a UE might include the device itself without such a module. In other cases, the term "UE" might refer to devices that have similar capabilities but that are not transportable, such as desktop computers, set-top boxes, or network appliances. The term "UE" could also refer to any hardware or software component that could terminate a communication session for a user.

Mobile communications has become an everyday commodity. In a communication system, radio resources are shared by a plurality of control channels and a number of data channels between base stations and user equipment. A base station identifies UEs through control channels and transmits data to the UEs via data channels. When the number of UEs connected to the base stations is relatively low, system resources are sufficient for control channels and data channels of all connected UEs. However, number of UEs connected to the base station varies a lot in different environments.

FIG. 1 is a schematic diagram illustrating a scenario of machine type communications. The numerous UEs 11 access and share the system resources simultaneously. For the machine type communication, the demands for higher control channel capacity and data channel capacity dramatically increase. Therefore, how to multiplex the control channels and the data channels corresponding to UEs 11 wherein the improvement of flexibility and efficiency of the resource utilization is a worth research issue.

SUMMARY

The disclosure is directed to a mobile communications, and more particularly to a transmitting method, a transmitter, a receiver and an associated scheduling method in Long Term Evolution networks.

An exemplary embodiment provides a method for transmitting signals applied to an access node. The method includes steps of allocating a first control power to a first control signal to be transmitted with a first sub-carrier in a first time duration and allocating a first data power to a first data signal to be transmitted with the first sub-carrier in the first time duration. The first control power and the first data power are different. The method also includes steps of multiplexing first control signal and the first data signal by superimposing the first control power and the first data power, and transmitting the multiplexed first control signal and the multiplexed first data signal with the first sub-carrier in the first time duration.

Another exemplary embodiment provides a transmitter for transmitting signals applied to an access node. The transmitter includes a scheduler, a power adjustment module, a multiplexing module and a transmitting circuit. The scheduler determines a first control power to be allocated to a first control signal and a first data power to be allocated to a first data signal. The first control signal and the first data signal are to be transmitted with a first sub-carrier in a first time duration, and the first control power and the first data power are different. The power adjustment module is operatively coupled to the scheduler. The power adjustment module adjusts power of the first control signal to the first control power and adjusting power of the first data signal to the first data power according to control of the scheduler. The multiplexing module multiplexes the first control signal and the first data signal by superimposing the first control power and the first data power. The transmitting circuit transmits the multiplexed first control signal and the multiplexed first data signal with the first sub-carrier in the first time duration.

Another exemplary embodiment provides a receiver of a user equipment. The receiver includes a receiving circuit, a first detection unit, and a second detection unit. The receiving circuit receives a communication signal including a first control signal being allocated with a first control power and a first data signal being allocated with a first data power. The first control signal and the first data signal both are transmitted with a first sub-carrier in a first time duration. The first control signal and the first data signal are multiplexed by superimposing the first control power and the first data power, and the first control power and the first data power are different. One of the first control signal and the first data signal with larger power is defined as a first processing signal, and the other of the first control signal and the first data signal is defined as a second processing signal. The first detection unit detects the first processing signal based on the communication signal to generate a first detected signal corresponding to the first processing signal. The second detection unit generates an interference signal based on at least one of the first processing signal and the first detected signal, cancels the interference signal from the communication signal to obtain an intermediate signal, and detects the second processing signal based on the intermediate signal to generate a second detected signal corresponding to the second processing signal.

An exemplary embodiment provides a method for transmitting signals with scheduling. The method includes steps of allocating a plurality of control power to a number of control signals wherein a total power consumption including the control power is minimized, and allocating a number of data rate to a number of data signals, wherein a total data rate including the data rates could be maximized. The method also includes steps of multiplexing at least one of the control signals and at least one of the data signals by superimposing power corresponding to the at least one of the control signals and power corresponding to the at least one of the data signals, and transmitting the multiplexed signals with a first sub-carrier in a first time duration.

Another exemplary embodiment provides, a method for transmitting signals is provided. The method for transmitting signals includes steps of allocating a first control power to a first control signal and a first data power to a first data signal. The first control signal and the first data signal are to be transmitted with a first sub-carrier in a first time duration, and the first control power and the first data power are different, and multiplexing the first control signal and the first data signal by superimposing the first control power and the first data power. The method includes a step of performing at least one of a time division multiplexing and a frequency division multiplexing, wherein a second control signal and a second data signal are multiplexed by the time division multiplexing, wherein the second control signal is to be transmitted with a second sub-carrier in a first sub-duration of a second time duration, the second data signal is to be transmitted with the second sub-carrier in a second sub-duration of the second time duration, and a third control signal and a third data signal are multiplexed by the frequency division multiplexing, wherein the third control signal is to be transmitted with a third sub-carrier in a third time duration, and the third data signal is to be transmitted with a fourth sub-carrier in the third time duration. The method also includes a step of transmitting the multiplexed control signals and the multiplexed data signals.

BRIEF DESCRIPTION OF THE DRAWINGS

FIG. 11A is a flowchart illustrating receiving process of the UE1 in FIG. 8 based on scheme II in accordance with an embodiment.

FIG. 11B is a schematic diagram illustrating configuration of receiver of UE1 while processing control signal (step S53 in FIG. 11A) in accordance with an embodiment.

FIG. 11C is a schematic diagram illustrating configuration of receiver of UE1 while processing data signal (step S55 in FIG. 11A) in accordance with an embodiment.

FIG. 15A is a schematic diagram illustrating a separation circuit generating a first intermediate signal from the communication signal in accordance with an embodiment.

FIG. 15B is a schematic diagram illustrating a separation circuit generating a second intermediate signal from the first intermediate signal in accordance with an embodiment.

Figure 1:
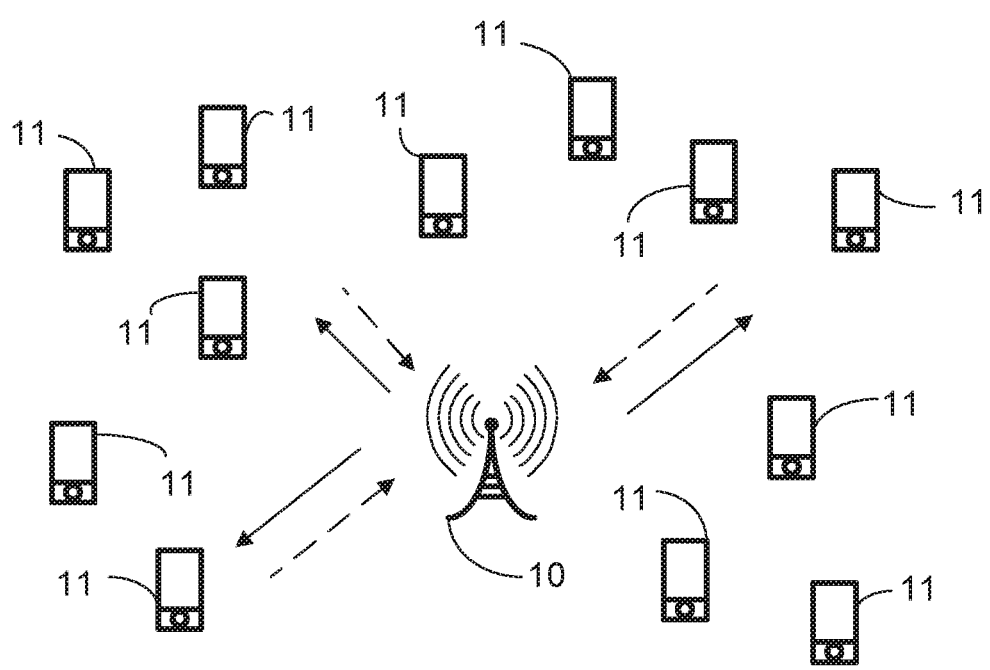
FIG. 1 is a schematic diagram illustrating a scenario of machine type communications.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Long Term Evolution (hereinafter, LTE) exploits both the frequency domain and the time domain for transmissions between the base station and the UEs. In one embodiment, a time duration last for 1 millisecond is defined as a subframe. The subframe includes, for example, 14 OFDM symbols in the time domain and transmission bandwidth includes a number of sub-carriers. The actual number of sub-carriers is dependent on the transmission bandwidth. Resource elements (hereinafter, RE) and resource blocks (hereinafter, RB) are important units in LTE. Each RE consists of one sub-carrier during one OFDM symbol interval, and each RB includes a number of consecutive sub-carriers (for example, 12 sub-carriers) in the frequency domain and one slot (for example, 7 OFDM symbols) in the time domain. Two adjacent RBs (hereinafter, RB-pair) are often used together for transmission.

Figure 2:
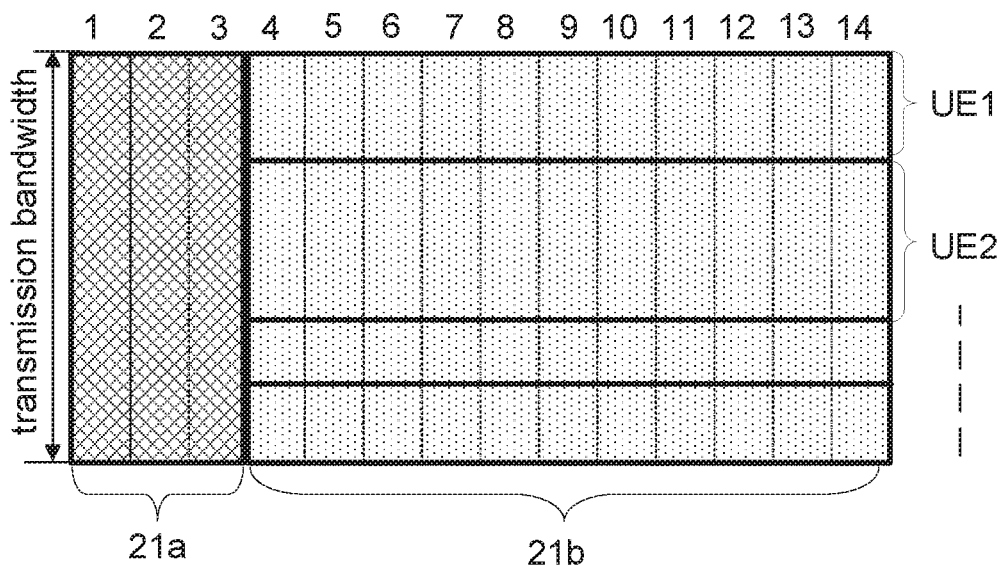
FIG. 2 is a schematic diagram illustrating a downlink subframe in LTE.

FIG. 2 is a schematic diagram illustrating a downlink subframe in LTE. According to LTE, the downlink subframe 21 is normally divided into a control region 21a including the first few OFDM symbols, and a data region 21b, including the remaining part of the subframe 21. For the sake of simplicity, the mesh-like shading is corresponding to control channel and the dotted shading is corresponding to data channel.

The control region 21a may include several types of control channels such as physical control format indicator channel (hereinafter, PCFICH), physical hybrid ARQ indicator channel (hereinafter, PHICH), and physical downlink control channel (hereinafter, PDCCH). Among these control channels, PDCCH carries at least one downlink control information (hereinafter, DCI) messages which includes information such as modulation order, payload size of corresponding data, and hybrid automatic repeat request (hereinafter, HARQ) process number for downlink reception. The data region 21b includes physical downlink shared channel (hereinafter, PDSCH), the main data bearing channel.

According to LTE, detail about PDCCH and PDSCH are priori unknown to the UE, and a blind decoding is implemented at the UE. The basic idea of the blind decoding is to blindly decode DCI, which may indicate the PDSCH specifically corresponding to the UE, from the control region by trying different aggregation levels (hereinafter, AL).

In FIG. 2, the control region 21a uses only the first few symbols for control channel. Once the number of UEs increases, the capacity of the control region is limited and unlikely enough to transmit DCI for all UEs.

Figure 3:
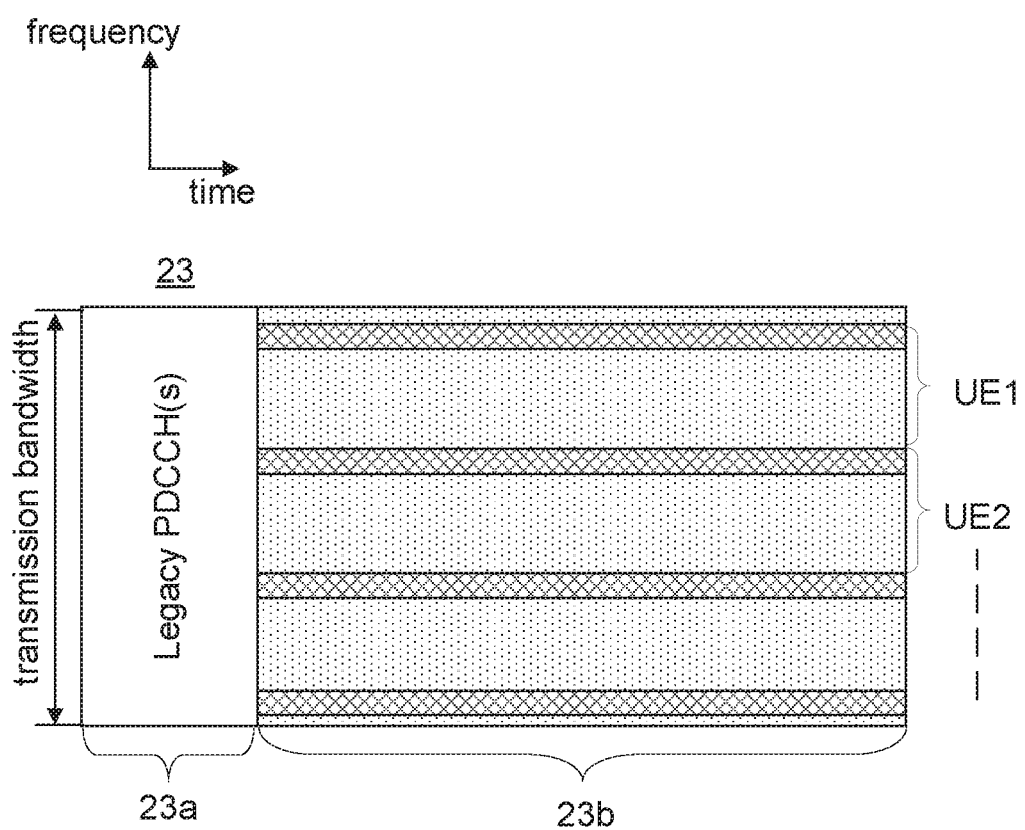
FIG. 3 is a schematic diagram illustrating a downlink subframe in LTE-A.

FIG. 3 is a schematic diagram illustrating a downlink subframe in LTE-A. Enhanced PDCCH (hereinafter, EPDCCH) is introduced in LTE-Advanced (LTE release 11) (hereinafter, LTE-A). In the downlink subframe 23, a reserved control region 23a is used for transmitting legacy PDCCH(s) and a mixed region 23b is used for transmitting the EPDCCH and PDSCH. Since some REs are used by EPDCCH, the number of REs available for PDSCH is dramatically decreased.

In short, the PDCCH in LTE is time-division-multiplexed with the PDSCH, and the EPDCCH in LTE-A is frequency-division-multiplexed with the PDCSH. Nevertheless, such predefined allocation schemes for multiplexing control and data channels are not suitable for some other application scenarios. Although downlink transmission between a base station and UE(s) are illustrated as examples below, the concept of the present disclosure could be applied to various communication signal and various communication systems. The following embodiments propose power allocation schemes for multiplexing control channels and data channels wherein flexibility and efficiency of the resource utilization could be improved.

Figure 4:
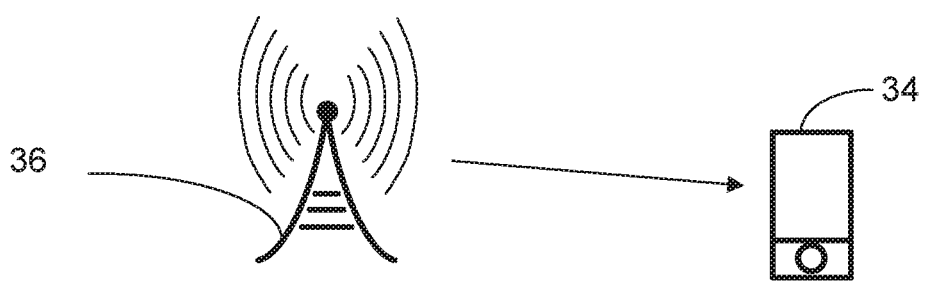
FIG. 4 is a schematic diagram illustrating downlink transmission between a base station and a UE.

FIG. 4 is a schematic diagram illustrating downlink transmission between a base station 36 and a UE 34. Downlink transmission implies that the UE 34 receives, or downloads, data from an access node. The access node, for example, is implemented by a base station 36.

Figure 5:
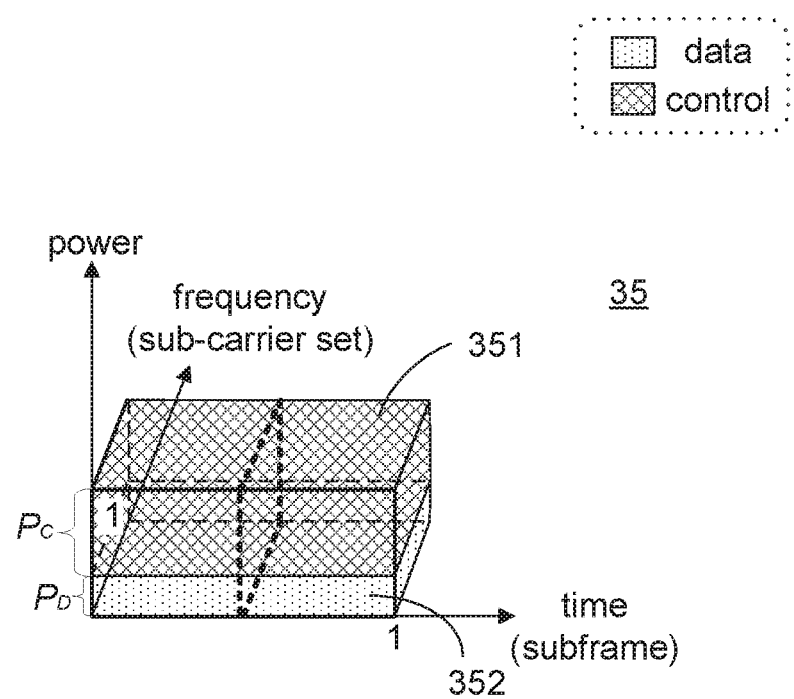
FIG. 5 is a schematic diagram illustrating the power to be allocated to the control signal and the data signal being transmitted by the base station in FIG. 4 in accordance with an embodiment.

FIG. 5 is a schematic diagram illustrating the power to be allocated to the control signal and the data signal of UE in accordance with an embodiment. A control signal 351 and a data signal 352 are transmitted from the base station 36 to the UE 34. The RB-pair 35 includes a plurality of adjacent sub-carriers (for example, 12 sub-carriers) in a time duration (subframe). For the sake of convenience, the sub-carriers in the RB-pair are defined as a sub-carrier set.

Power to be allocated to the control signal 351 is defined as control power $P_C$ and power to be allocated to the data signal 352 is defined as data power $P_D$. The (magnitude of) control power $P_C$ is different from the (magnitude of) the data power $P_D$. In FIG. 5, the control power $P_C$ is assumed to be larger than the data power $P_D$ ($P_C > P_D$). Before the base station transmits the control signal 351 and the data signal 352, the control power $P_C$ and the data power $P_D$ are superimposed at an identical RB-pair 35.

Furthermore, summation of the control power $P_C$ and the data power $P_D$ in the RB-pair 35 is less than or equal to a power constraint (P), that is $P_C + P_D \leq P$. The power constraint (P) could be consistent and valid for a predetermined duration. During the downlink transmission, each UE reports an estimate of the instantaneous signal quality to the base station. Once the access node receives these estimates from the UEs, the access node may dynamically determine, modify or update the amplitude of the power constraint and its validation duration. Moreover, the control power $P_C$ and the data power $P_D$ may also be adjusted according to these estimates.

Some reference signals are transmitted by the base station and used for demodulation purposes. In the configuration of single antenna port, there are four reference signals within each RB. Because locations of the reference signals are specified in advance, the reference signals could be used to carry power allocation related information.

Figure 6:
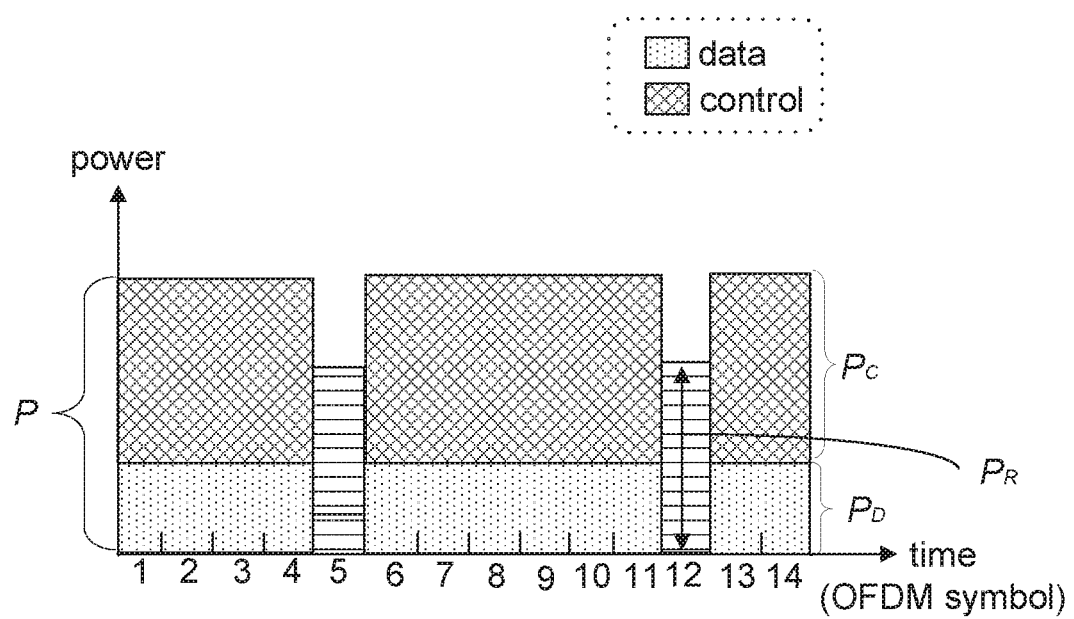
FIG. 6 is a schematic diagram illustrating power of the reference signals in accordance with an embodiment.

FIG. 6 is a schematic diagram illustrating power of the reference signals with a sub-carrier set in a subframe in accordance with an embodiment. In FIG. 6, it is assumed that the reference signals are assigned to the fifth OFDM symbol and the twelfth OFDM symbol. For the REs being allocated with reference signals, power of the reference signals $P_R$ are assumed to be equal to control power $P_C$, that is, $P_R = P_C$.

In some embodiments, the power of the reference signal $P_R$ is not necessary to be equal to the control power $P_C$. Instead, the reference signals may be processed to obtain information about the amplitude of the control power $P_C$. For the sake of simplicity, usage of the reference signals are not specifically indicated nor illustrated in following figures.

Figure 7:
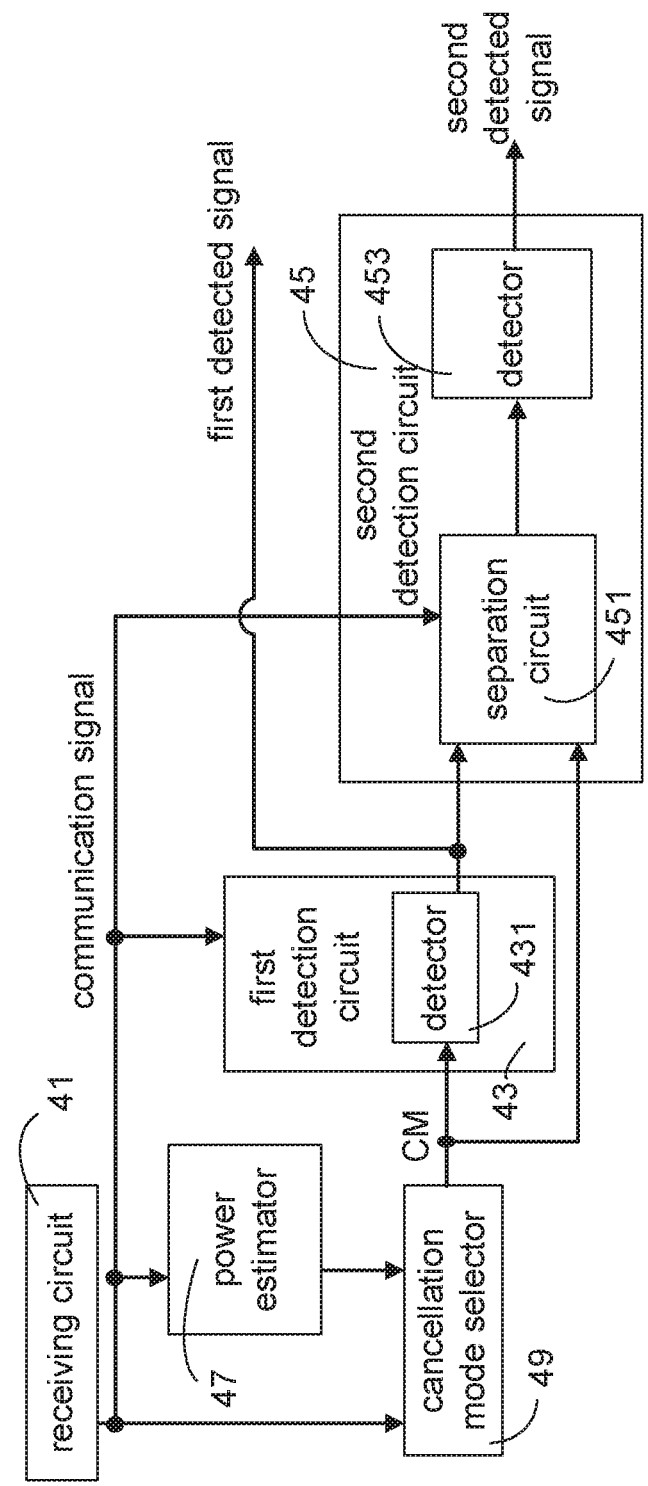
FIG. 7 is a schematic diagram illustrating a receiver of the UE in FIG. 4 in accordance with an embodiment.

FIG. 7 is a block diagram illustrating a receiver of the UE in FIG. 4 in accordance with an embodiment. The receiver includes a receiving circuit 41, a power estimator 47, a cancellation mode selector 49, a first detection unit 43, and a second detection unit 45. For the sake of convenience, a signal to be received and processed by the receiver may be defined as a target signal. When the power of the target signal is larger than the power of the other signal(s) contained in a communication signal, the target signal is considered as the first processing signal and the first detection unit 43 is selected to process first processing signal. When the power of the target signal is not larger than the power of the other signal(s) contained in the communication signal, the target signal is considered as the second processing signal and the second detection unit 45 is selected to process the target signal. The target signal may be a control signal 351 or a data signal 352.

When the target signal is a control signal 351, the receiving circuit 41 transmits the communication signal to the cancellation mode selector 49 via the power estimator 47. When the target signal is a data signal 352, the receiving circuit 41 directly transmits the communication signal to the cancellation mode selector 49 without passing the power estimator 47.

The cancellation mode selector 49 generates an output, a cancellation mode (hereinafter, CM) signal, representing whether the target signal is with the larger power in the communication signal. If power allocated to the target signal is the largest in the communication signal, the cancellation mode selector 49 is assumed to output "CM=1", and the first detection unit 43 is selected for detecting the target signal from the communication signal. If power allocated to the target signal is not the largest in the communication signal, the cancellation mode selector 49 is assumed to output "CM=0", and the second detection unit 45 is selected for detecting the target signal from the communication signal.

The first detection unit 43 includes a detector 431, and the output of the first detection unit 43 is defined as a first detected signal. The second detection unit 45 includes a separation circuit 451 and a detector 453, and the output of the second detection unit 45 is defined as a second detected signal.

As mentioned in FIG. 5, the communication signal includes the control signal 351 and the data signal 352 in the same RB-pair, and the power allocated to the control signal is assumed to be larger than the power allocated to the data signal in the communication signal. While UE is detecting DCI based on the control signal 351, the first detection unit 43 is selected by the cancellation mode selector 49 because the control power $P_C$ is greater than the data power $P_D$. While UE1 is detecting the data content based on the data signal 352, the second detection unit 45 is selected by the cancellation mode selector 49 because the data power $P_D$ is less than the control power $P_C$. According to the embodiment, the first detection unit 43 may directly detect the control signal 351 from the communication signal, but the second detection unit 45 has to cancel the control signal 351 from the communication signal before detecting the data signal 352.

As mentioned above, before detecting a data signal, its corresponding control signal is detected first. Therefore, the receiving circuit 41 first transmits the communication signal to the cancellation mode selector 49 via the power estimator 47 so that the power estimator 47 may acquire the control power $P_C$ based on the reference signals. The acquired control power $P_C$ is an estimated result outputted to the cancellation mode selector 49. The cancellation mode selector 49 receives the estimated result of control power $P_C$ from the power estimator 47, and the communication signal from the receiving circuit 41, respectively. The first detection unit 43 is selected and the detector 431 of the first detection unit 43 detects DCI corresponding to the data signal 352.

The first detection unit 43 further transmits DCI to the second detection unit 45. DCI may include the location of the data signal 352, the cancellation mode, radio network temporary identifier (hereinafter, RNTI) and other useful information related to the downlink transmission. Therefore, the UE may identify that the location of the data signal 352 and corresponding control signal 351 are allocated in the same RB-pair. In the second detection unit 45, an interference cancellation (hereinafter, IC) process is executed. In the IC process, the separation circuit 451 may generate an intermediate signal by cancelling the control signal 351 from the communication signal. The intermediate signal is sent to the detector 453 for detecting the data content corresponding to the data signal 352.

According to the above embodiment, the first detection unit 43 is selected for the control signal 351 and the second detection unit 45 is selected for the data signal 352 because the control power $P_C$ is assumed greater than the data power. Alternatively, if the control power $P_C$ is assumed smaller than the data power $P_D$, the second detection unit 45 is selected for detecting DCI from the control signal 351, and the first detection unit 43 is selected for detecting the data content corresponding to the data signal 352.

In some applications, the communication signal may include more than one control signal and/or more than one data signal in one RB-pair. When there are more than two signals are superimposed in one RB-pair, the signal being allocated with the largest power will be detected by the first detection unit 43, and the rest signals will be detected by the second detection unit 45.

Figure 8:
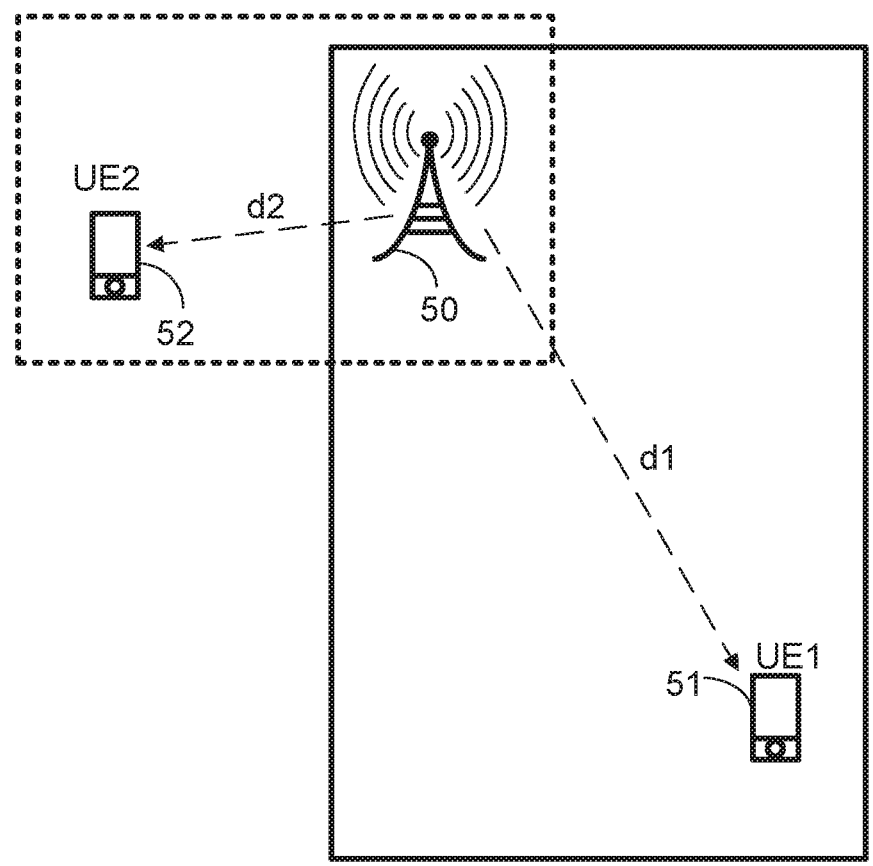
FIG. 8 is a schematic diagram illustrating downlink transmission between a base station and two UEs.

FIG. 8 is a schematic diagram illustrating downlink transmission between a base station and two UEs. The distance between the first user equipment (hereinafter, UE1) 51 and the base station 50 is denoted as "d1", and the distance between the second user equipment (hereinafter, UE2) 52 and the base station 50 is denoted as "d2". Because UE2 52 is relatively close to the base station 50, UE1 51 could be defined as a far UE, and UE2 52 could be defined as a near UE.

In following descriptions, "Ci" and "Di" are respectively denoted as control signal and data signal of the i-th UE. For example, the control signal of UE1 51 is denoted as the first control signal (C1), and the data signal of UE1 51 is denoted as the first data signal (D1). The control signal of UE2 52 is denoted as the second control signal (C2), and the data signal of UE2 52 is denoted as (D2). Furthermore, a first control power $P_{C1}$ represents the power to be allocated to the first control signal C1, a first data power $P_{D1}$ represents the power to be allocated to the first data signal (D1), a second control power $P_{C2}$ represents the power to be allocated to the second control signal (C2), and a second data power $P_{D2}$ represents the power to be allocated to the second data signal (D2). Two schemes for multiplexing control power to control signals and data power to data signals are respectively demonstrated in FIG. 9 and FIGS. 10A and 10B.

Figure 9:
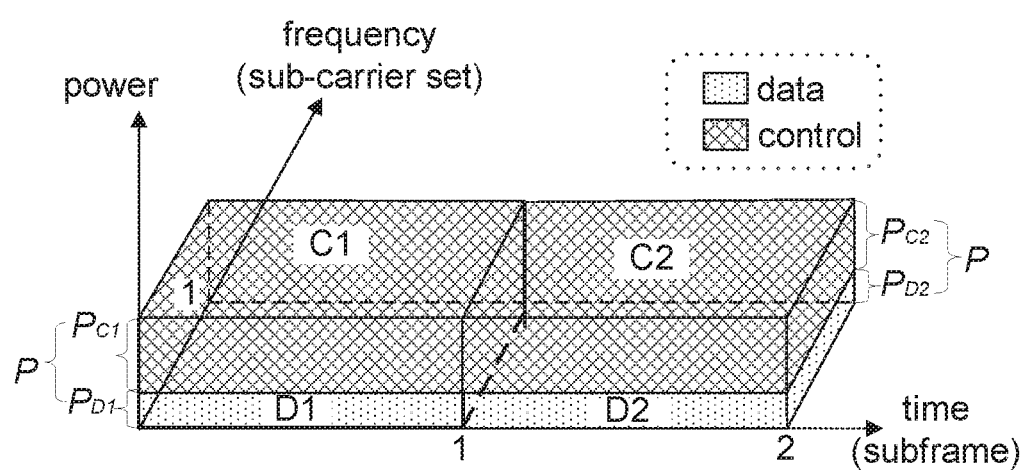
FIG. 9 is a schematic diagram illustrating a power allocation scheme (scheme I) for control channel and data channel in accordance with an embodiment.

FIG. 9 is a schematic diagram illustrating a power multiplexing scheme (scheme I) for control channel and data channel in accordance with an embodiment. Scheme I is a straightforward allocation scheme that the control signal and its corresponding data signal are transmitted with identical RB-pair. For example, in FIG. 9, the first control signal (C1) and the first data signal (D1) are both transmitted with the RB-pair corresponding to the first subframe. The second control signal (C2) and the second data signal (D2) are transmitted with the RB-pair corresponding to the second subframe. According to the scheme I, the control signal and its corresponding data signal are multiplexed with identical sub-carriers in identical time duration. Therefore, complexity of scheme I is relatively low.

With the power division multiplexing (hereinafter, PDM) transmission, the data signals for UE1 51 and UE2 52 may be superimposed on the same resource (identical time duration and identical frequency) and with different power according to their channel gains.

To secure that the UE close to cell edge may still successfully receive control and/or data signals, relative distance between the UEs and the base station are further concerned in scheme II. According to scheme II, the channel gain of the near UE (UE2) ($h_N$) is greater than the channel gain of the far UE (UE1) ($h_F$). Because the latter is relatively farther to the base station, more power loss may occur. Assuming the power constraint P is equal to one (P=1), the first data power ($P_{D1}$) and the second data power ($P_{D2}$) are respectively assumed to be (1−α) and α. The communication signals ($r_1$, $r_2$) received at UE1 51 and UE2 52 are respectively written as equations (1) and (2). In equation (1), $n_1$ represents noise of UE1 51; and in equation (2), $n_2$ represents noise of UE2 52.

$$r_1 = h_N(\sqrt{\alpha}D2 + \sqrt{(1-\alpha)}D1) + n_1 \quad \text{equation (1)}$$

$$r_2 = h_F(\sqrt{\alpha}D2 + \sqrt{(1-\alpha)}D1) + n_2 \quad \text{equation (2)}$$

In other words, the power allocated to the control and/or data signals to be transmitted to the UE close to the cell edge may be higher than the power allocated to the control and/or data signals to be transmitted to the UE close to the cell center. Moreover, the control signal and its corresponding data signal are not necessary to be multiplexed with identical RB-pair in scheme II.

Figure 10A:
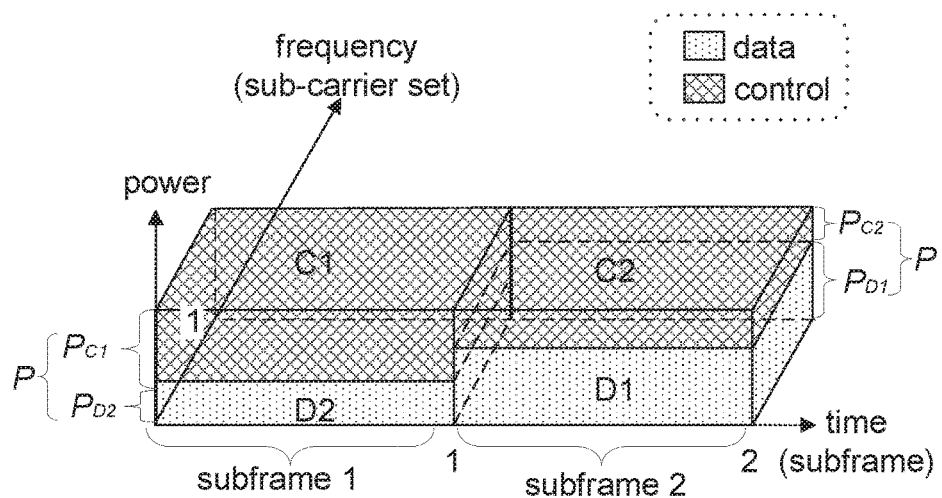
FIG. 10A is a schematic diagram illustrating another power allocation scheme (scheme II) for control channel and data channel while different subframes are utilized in accordance with an embodiment.

FIG. 10A is a schematic diagram illustrating another power allocation scheme (scheme II) for control channel and data channel while different subframes are utilized in accordance with an embodiment. In the first (left) subframe (subframe 1), the first control signal (C1) is overlapped with the second data signal D2. In the second (right) subframe (subframe 2), the second control signal (C2) is overlapped with the first data signal (D1). The first control power $P_{C1}$ is larger than the second data power $P_{D2}$ in the first subframe (subframe 1), and the first data power $P_{D1}$ is larger than the second control power $P_{D2}$ in the second subframe (subframe 2). Therefore, UE1 51 does not need to proceed the IC process for any of the first and the second subframes because the first control signal (C1) and the first data signal (D1) are both allocated with larger power compared with the second control signal (C2) and the second data signal (D2). As for UE2 52, IC could be performed to cancel interferences caused by the first control signal (C1) in the first subframe (subframe 1) and the first data signal (D1) in the second subframe (subframe 2).

According to FIG. 10A, the first control signal (C1) and the first data signal (D1) are multiplexed with different subframes which are corresponding to identical sub-carriers. Alternately, in FIG. 10B, the control signal and data signal of a specific UE may be multiplexed with different RB-pairs which are corresponding to different sub-carriers and identical subframe.

Figure 10B:
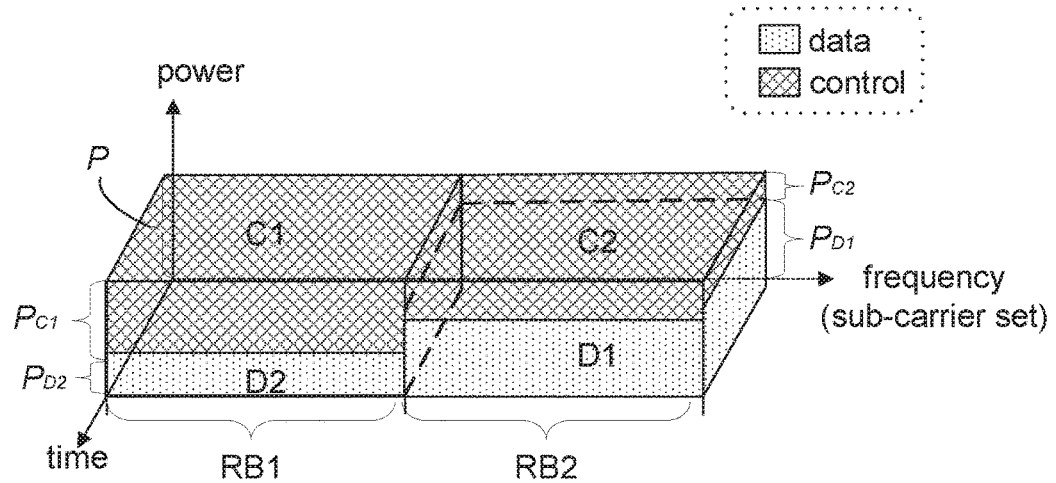
FIG. 10B is a schematic diagram illustrating another power allocation scheme (scheme II) for control channel and data channel while different RB-pairs are utilized in accordance with an embodiment.

FIG. 10B is a schematic diagram illustrating another power allocation scheme (scheme II) for control channel and data channel while different RB-pairs are utilized in accordance with an embodiment. In the first (left) RB-pair (RB1), the first control signal (C1) is overlapped with the second data signal (D2). In the second (right) RB-pair (RB2), the second control signal (C2) is overlapped with the first data signal (D1). The first control power $P_{C1}$ is larger than the second data power $P_{D2}$ in the first RB-pair (RB1), and the first data power $P_{D1}$ is larger than the second control power $P_{D2}$ in the second RB-pair (RB2). Therefore, UE1 51 does not need to proceed the IC process for any of the first and the second RB-pairs because the first control signal (C1) and the first data signal (D1) are both allocated with larger power compared with the second control signal (C2) and the second data signal (D2). As for UE2 52, IC could be performed to cancel interferences caused by the first control signal (C1) and the first data signal (D1).

FIGS. 10A and 10B are examples illustrate that allocation of control and data power based on scheme II is flexible. In practical application, scheme I and the two examples of scheme II could also be interchangeably selected and/or adopted together. For example, power of control and data signals corresponding to a UE are allocated to an identical subframe and identical sub-carriers, power of control and data signals corresponding to another UE are allocated to different subframes but identical sub-carriers, and power of control and data signals corresponding to still another UE are allocated to an identical subframe but different sub-carriers.

FIG. 11A is a flowchart illustrating receiving process of UE1 in FIG. 8 based on scheme II in accordance with an embodiment. UE1 51 receives the communication signal (step S51), detects DCI corresponding to the first control signal (C1) by processing the first subframe (subframe 1) in FIG. 10A or the first RB-pair (RB1) in FIG. 10B of the communication signal (step S53), and detects data content corresponding to the first data signal (D1) by processing the second subframe (subframe 2) in FIG. 10A or the second RB-pair (RB2) in FIG. 10B of the communication signal (step S55). Details about steps S53 and S55 could be respectively referred together with FIGS. 11B and 11C.

FIG. 11B is a schematic diagram illustrating configuration of receiver of UE1 while acquiring DCI corresponding to the first control signal (C1) (step S53 in FIG. 11A) in accordance with an embodiment. Based on scheme II, the first control signal (C1) is the signal having the larger power in RB1, and the first detection unit 513 is selected for detecting the first control signal (C1). After the receiving circuit 511 receives the communication signal, the power estimator 517 estimates the first control power $P_{C1}$ in the first subframe (subframe 1) in FIG. 10A or the first RB-pair (RB1) in FIG. 10B (step S53a). The control signal detector 513a may acquire DCI corresponding to the first control signal (C1) from the communication signal (step S53b). After DCI corresponding to the first control signal (C1) is retrieved, location of the first data signal (D1), that is, second subframe (subframe 2) in FIG. 10A or the second RB-pair (RB2) in FIG. 10B, is known.

FIG. 11C is a schematic diagram illustrating configuration of receiver of UE1 while acquiring data content corresponding to the first data signal (D1) (step S55 in FIG. 11A) in accordance with an embodiment. Based on scheme II, the first data signal (D1) is the signal having the larger power in the second subframe (subframe 2) in FIG. 10A or the second RB-pair (RB2) in FIG. 10B, and the first detection unit 513 is selected for detecting the first data signal (D1). After the receiving circuit 511 receives the communication signal, the data signal detector 513b may acquire data content corresponding to the first data signal (D1).

Figure 12B:
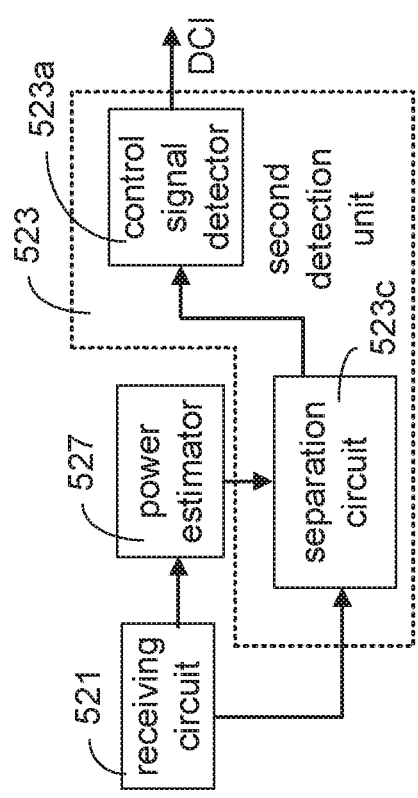
FIG. 12B is a schematic diagram illustrating configuration of receiver of UE2 while processing control signal (step S54 in FIG. 12A) in accordance with an embodiment.
Figure 12C:
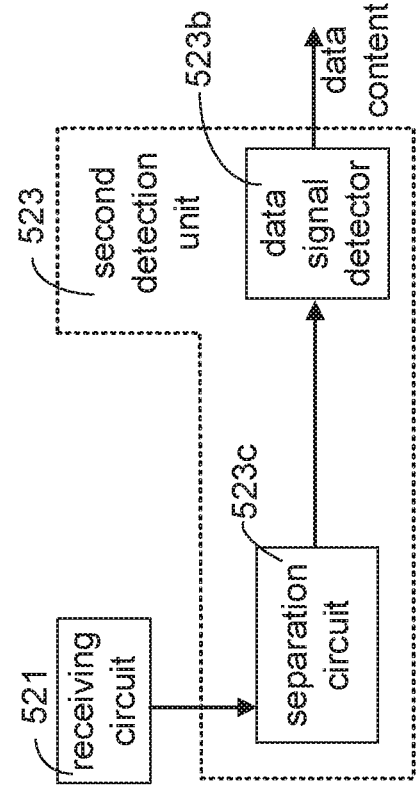
FIG. 12C is a schematic diagram illustrating configuration of receiver of UE2 while processing data signal (step S56 in FIG. 12A) in accordance with an embodiment.
Figure 12A:
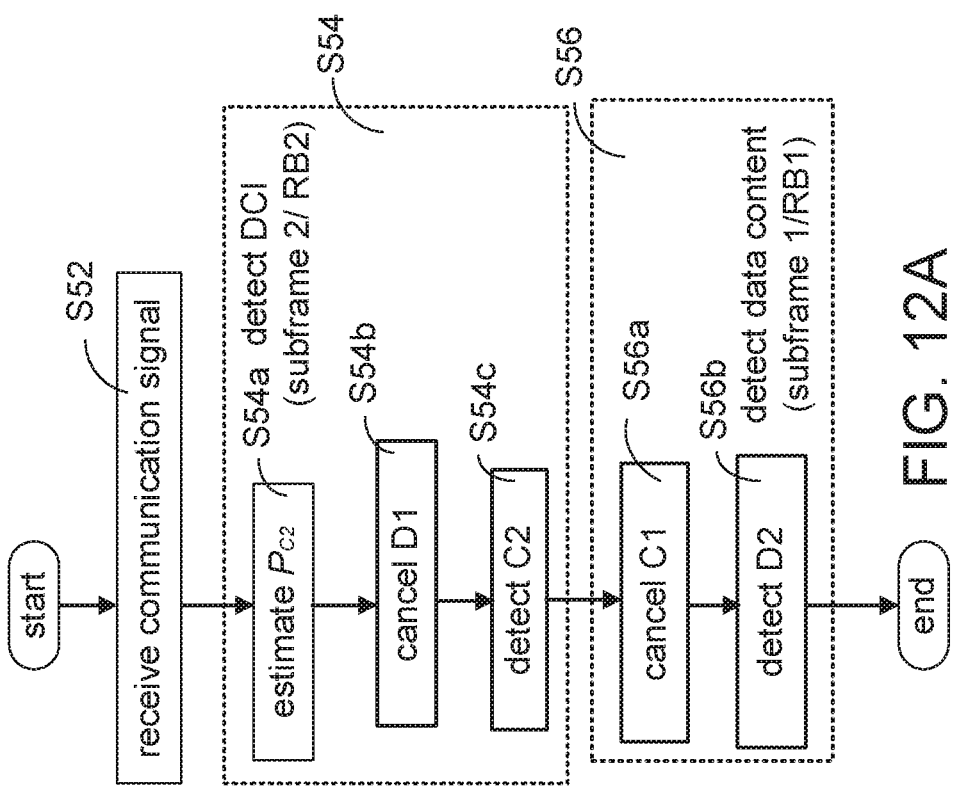
FIG. 12A is a flowchart illustrating receiving process of the UE2 in FIG. 8 based on scheme II in accordance with an embodiment.

FIG. 12A is a flowchart illustrating receiving process of UE2 in FIG. 8 based on scheme II in accordance with an embodiment. According to embodiments of the present disclosure, IC process is adopted by UE2 52 for cancelling interferences of the first control signal (C1) and the first data signal (D1). UE2 52 receives the communication signal (step S52), detects DCI corresponding to the second control signal (C2) by processing the second subframe (subframe 2) in FIG. 10A or the second RB-pair (RB2) in FIG. 10B of the communication signal (step S54), and detects data content corresponding to the second data signal (D2) by processing the second subframe (subframe 2) in FIG. 10A or the second RB-pair (RB2) in FIG. 10B of the communication signal (step S56). Details about step S54 and step S56 could be referred together with FIGS. 12B and 12C.

FIG. 12B is a schematic diagram illustrating configuration of receiver of UE2 while acquiring DCI corresponding to the second control signal (C2) (step S54 in FIG. 12A) in accordance with an embodiment. Based on scheme II, the second control signal (C2) is not the signal having larger power in the second subframe (subframe 2) in FIG. 10A or the RB-pair (RB2) in FIG. 10B, and the second detection unit 523 is selected for detecting the second control signal (C2). After the receiving circuit 521 receives the communication signal, the power estimator 527 estimates the second control power $P_{C2}$ (step S54a). The separation circuit 523c generates an intermediate signal by cancelling the first data signal (D1) from the communication signal (step S54b). The intermediate signal is transmitted to the control signal detector 523a for detecting DCI corresponding to the second control signal (C2) (step S54c). After DCI corresponding to the second control signal (C2) is retrieved, location of the second data signal (D2), that is, the first subframe (subframe 1) in FIG. 10A or the first RB-pair (RB1) in FIG. 10B, is known.

FIG. 12C is a schematic diagram illustrating configuration of receiver of UE2 while processing control signal (step S56 in FIG. 12A) in accordance with an embodiment. Based on scheme II, the second data signal (D2) is not the signal having larger power in the first subframe (subframe 1) in FIG. 10A or the first RB-pair (RB1) in FIG. 10B, and the second detection unit 523 is selected for detecting the second data signal (D2). After the receiving circuit 521 receives the communication signal, the separation circuit 523c generates an intermediate signal by cancelling the first control signal (C1) from the communication signal (step S56a). The intermediate signal is transmitted to the data signal detector 523b for detecting data content corresponding to the second data signal (D2) (step S56b).

Based on the above illustrations, when the near UE acquires its control signal and data signal, the interference caused by the control and/or data signals be transmitted to the far UE might not be ignored and could be cancelled from the communication signal in advance. In short, when the power allocated to the first control signal, the second control signal, the first data signal, and the second data signal are based on scheme II, the power allocated to the control signal and data signal of the far UE are relatively higher. As the UE being allocated with lower control power and data power needs more IC process, the throughput of scheme II may not be as good as that of scheme I. However, coverage of scheme II is much better than that of scheme I because relative locations between UEs and the base station are considered.

Figure 13:
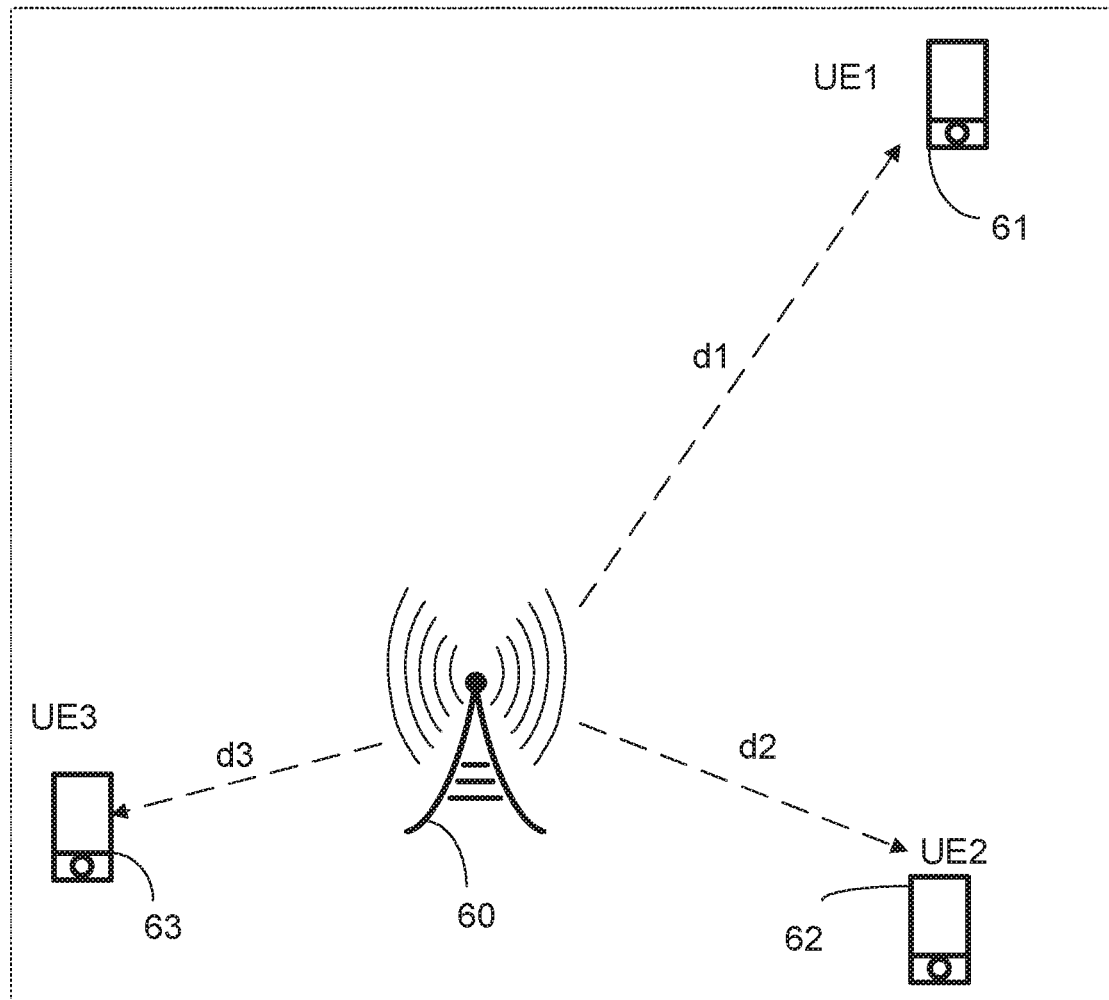
FIG. 13 is a schematic diagram illustrating downlink transmission between a base station and three UEs.

FIG. 13 is a schematic diagram illustrating downlink transmission between a base station and three UEs. The distance between UE1 61 and the base station 60 is denoted as "d1", the distance between UE2 62 and the base station 60 is denoted as "d2", and the distance between UE3 63 and the base station 60 is denoted as "d3". Among the three UEs in this network, UE3 63 is the one closest to the base station 60, UE2 62 is relatively closer to the base station 60, and UE1 61 is the one farthest from the base station 60.

Figure 14:
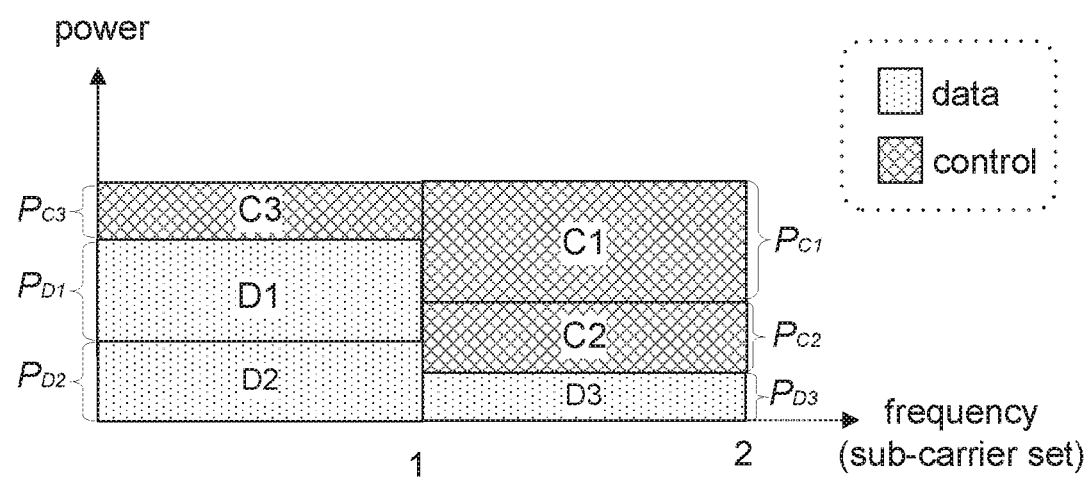
FIG. 14 is a schematic diagram illustrating power allocated to the control signal and the data signal being transmitted by the base station in FIG. 13 according to the allocation scheme II in accordance with an embodiment.

FIG. 14 is a schematic diagram illustrating power allocated to the control signal and the data signal being transmitted by the base station in FIG. 13 according to the scheme II in accordance with an embodiment. The power allocated to control and/or data signals of these UEs are in essence inversely proportional to the distance between the UEs and the base station. In the first sub-carrier set, the third control power $P_{C3}$ is allocated to the third control signal C3, the first data power $P_{D1}$ is allocated to the first data signal (D1) and the second data power $P_{D2}$ is allocated to the second data signal. The first data power $P_{D1}$ is assumed to be the largest in the first sub-carrier set, and the third control power $P_{C3}$ is assumed to be the smallest in the first sub-carrier set.

In the second sub-carrier set, the first control power $P_{C1}$ is allocated to the first control signal (C1), the second control power $P_{C2}$ is allocated to the second control signal (C2) and the third data power $P_{D3}$ is allocated to the third data signal (D3). The first control power $P_{C1}$ is assumed to be the largest in the second sub-carrier set, and the third data power $P_{D3}$ is assumed to be the least in the second sub-carrier set. The reference signals in the second sub-carrier set are used to indicate both the first control power $P_{C1}$ and the second control power $P_{C2}$.

When UE1 receives the communication signal and acquires the first control signal (C1) and the first data signal (D1), no IC is required. When UE2 receives the communication signal and acquires the second control signal (C2) and the second data signal (D2), IC process is required because the first control power $P_{C1}$ is larger than the second control power $P_{D2}$ in the second sub-carrier set. Similarly, UE2 cancels the interference caused by the first data signal (D1) in the first sub-carrier set to process the second data signal (D2).

When UE3 receives the communication signal and acquires the third control signal (C3) and the third data signal (D3), SIC is adopted to eliminate interferences caused by the first control signal, the second control signal, the first data signal and the second data signal. Because the first data power $P_{D1}$ and the second data power $P_{D2}$ are both larger than the third control power $P_{C3}$, the interferences caused by the first data signal (D1) and the second data signal (D2) are cancelled before a data signal detector of UE3 acquires DCI corresponding to the third control signal (C3) in the first sub-carrier set. Similarly, the interferences caused by the first control signal (C1) and the second control signal (C2) in the second sub-carrier set are cancelled before a data signal detector of UE3 acquires the data content corresponding to the third data signal (D3). The operation of UE3 regarding how the interferences caused by the first control signal (C1) and the second control signal (C2) are cancelled from the second sub-carrier set of the communication signal are illustrated in FIGS. 15A and 15B.

FIG. 15A is a schematic diagram illustrating a separation circuit 451 generating a first intermediate signal from the communication signal in accordance with an embodiment. The interference generation circuit 451a reproduces the signals causing interferences so that the summer circuit 451b (for example, an adder) may deduct the signals causing interferences from the communication signal. The summer circuit 451b accordingly generates and transmits an intermediate signal to the detector 453. In other words, when a transmitter jointly superimposes power of the control signal and power of the data signal at identical sub-carriers in an identical time duration, the signal being allocated with larger power probably interferes the signal being allocated with less power, and a receiver needs to adopt IC process. In some applications, a signal being allocated with less power may be interfered by a plurality of signals being allocated with larger power and the UE needs to adopt successive IC (hereinafter, SIC) process.

The interference generation circuit 451a includes a symbol-level separation module 4511 and an interference generator 4513, which are operatively coupled to each other. A switch SW is operatively coupled to the receiving circuit, the interference circuit 451a, and the summer circuit 451b. By switching the switch SW, an input of the interference circuit 451a and the summer circuit 451b is changed.

When the communication signal is received, the switch SW conducts the communication signal to the symbol-level separation module 4511 and the summer circuit 451b. The symbol-level separation module 4511 separates the first control signal (C1) from the communication signal in symbol level and the interference generator 4513 accordingly generates an interference signal, that is, the first control signal (C1). The summer circuit 451b deducts the first control signal (C1) from the communication signal and accordingly generates a first intermediate signal including the second control signal (C2) and the third data signal (D3).

Because the third data power $P_{D3}$ is not larger than the second control power $P_{C2}$, the switch SW needs to conduct the first intermediate signal to the interference circuit 451a. Then, a second cycle of IC is executed. FIG. 15B is a schematic diagram illustrating a separation circuit 451 generating a second intermediate signal from the first intermediate signal in accordance with an embodiment. The interference circuit 451b receives the first intermediate signal from the output of the summer circuit 451b. The symbol-level separation module 4511 separates the second control signal (C2) from the first intermediate signal in symbol level and the interference generator 4513 accordingly generates an interference signal according to the second control signal (C2). The summer circuit 451b cancels the second control signal (C2) from the first intermediate signal and accordingly generates a second intermediate signal including only the third data signal (D3). The separation circuits 451 outputs the second intermediate signal to the data signal detector.

As illustrated above, the communication signal may include at least one control signal and at least one data signal. If the power of a target signal, that is, a control signal or a data signal intends to be acquired, is larger than the power of any other signals which are multiplexed with same RB-pair, the first detection unit 43 is selected by the cancellation mode selector 49 and the first detection unit 43 is used for detecting the target signal. Whereas, if the power allocated to the target signal is not larger than the power allocated to the other signals, the second detection unit 45 is selected by the cancellation mode selector 49 and the second detection unit 45 is used for detecting the target signal. In some cases, more than one signal are allocated with power larger than the target signal, and the SIC process could be recursively executed by the second detection unit 45.

With the SIC process, the signals allocated with power larger than the target signal are gradually cancelled from the intermediate signal. The SIC process is considered as complete if the power corresponding to the target signal is the largest in the intermediate signal. Because the signals which are allocated with power less than the target signal only cause noises and could be ignored, the intermediate signal may still include signal(s) other than the target signal. Considering the complexity of the SIC process, some predetermined power levels for allocating control signal(s) and data signal(s) in the same RB-pair may be defined in advance. In such case, operation of the symbol-level separation module 4511 could be simplified and the processing time of the SIC process could be reduced.

Figure 16:
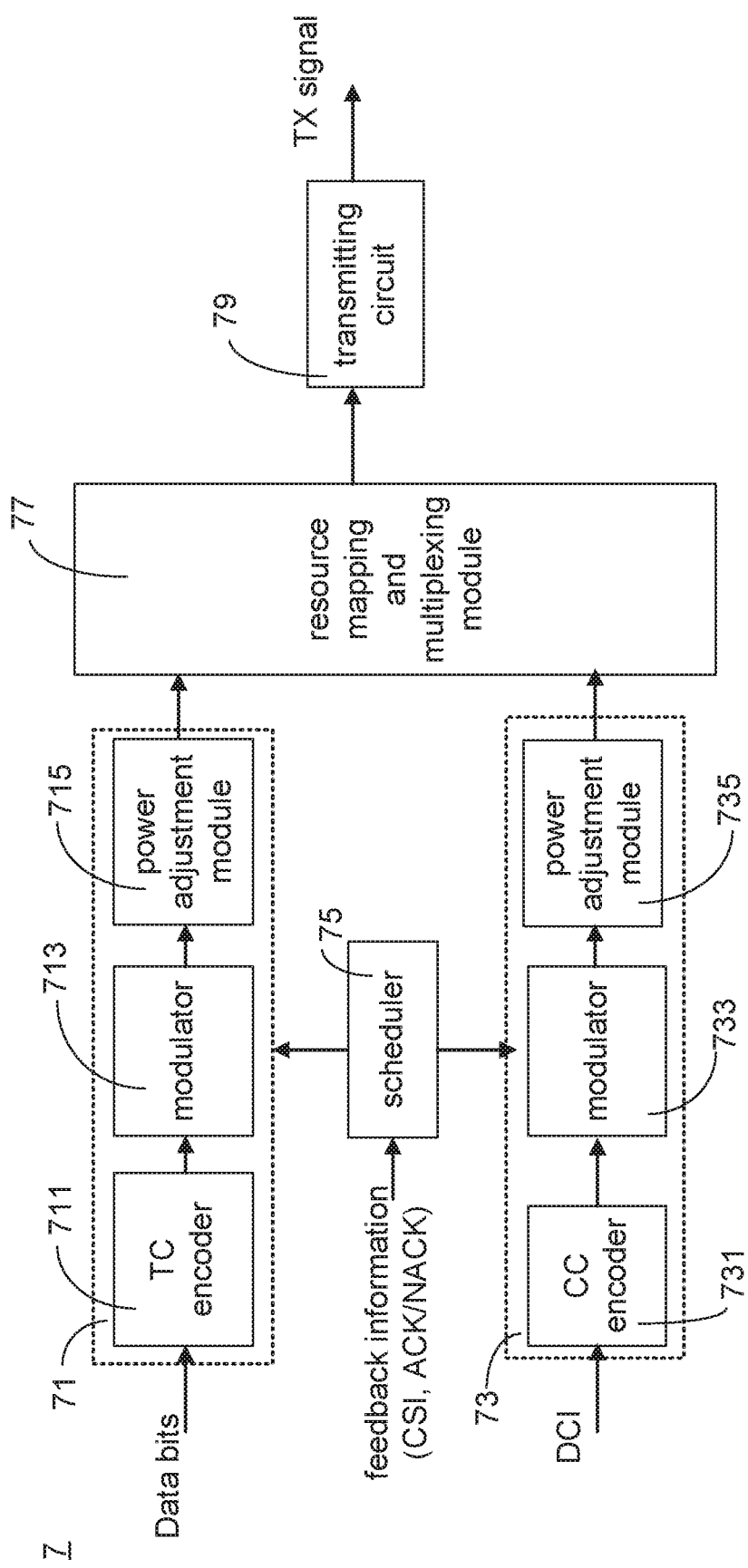
FIG. 16 is a schematic diagram illustrating a transmitter in accordance with an embodiment.

FIG. 16 is a schematic diagram illustrating a transmitter in accordance with an embodiment. The transmitter includes a data signal encoder, a control signal encoder, a scheduler, and a transmitting circuit. For each time duration, the scheduler 75 controls to which UEs the shared resources (for example, time, frequency, power) could be assigned. The scheduling process is repeated for every subframe, and the scheduler 75 outputs scheduling results to a control signal encoder 73 and a data signal encoder 71. While scheduling, the scheduler 75 may refer to the feedback information from UE(s), for example, Channel State Information (hereinafter, CSI), ACK/NACK, from the UEs and dynamically adjusts scheduling results by changing allocation strategy.

The control signal encoder 73 and the data signal encoder 71 respectively generate the power-adjusted control signals and the power-adjusted data signals according to the scheduling results. The data signal encoder 71 may encode data bits with a turbo code (hereinafter, TC) encoder 711. The encoded data bits are sent to the modulator 713 to generate modulated data symbols. The modulated data symbols are outputted to the power adjustment module 715 for adjusting data power. The power adjustment module 715 adjusts power level of the modulated data symbols accordingly. The control signal encoder 73 may encode DCI with a convolution code (hereinafter, CC) encoder 731, and the encoded DCI is transmitted to the modulator 733. The modulator 733 receives the encoded DCI to generate modulated DCI symbols. The modulated DCI symbols are then outputted to the power adjustment module 735 for adjusting control power.

After being adjusted by the power adjustment modules 715, 735, the modulated data symbols and DCI symbols are transmitted to the resource mapping and multiplexing module 77. The resource mapping and multiplexing module 77 maps the modulated data symbols and DCI symbols to REs. Signals of the REs are initiated to "0" before the resource mapping and multiplexing module 77 starts mapping the modulated data symbols and DCI symbols. The resource mapping and multiplexing module 77 takes the symbols to be transmitted on each antenna port and maps them to the REs of the set of RB-pairs assigned by the scheduler 75 for the transmission. The multiplexed results are transmitted by the transmitting circuit 79. The scheduler 75 also maps the reference signals to the RB-pairs so that the communication signal is multiplexed with the reference signals.

Figure 17:
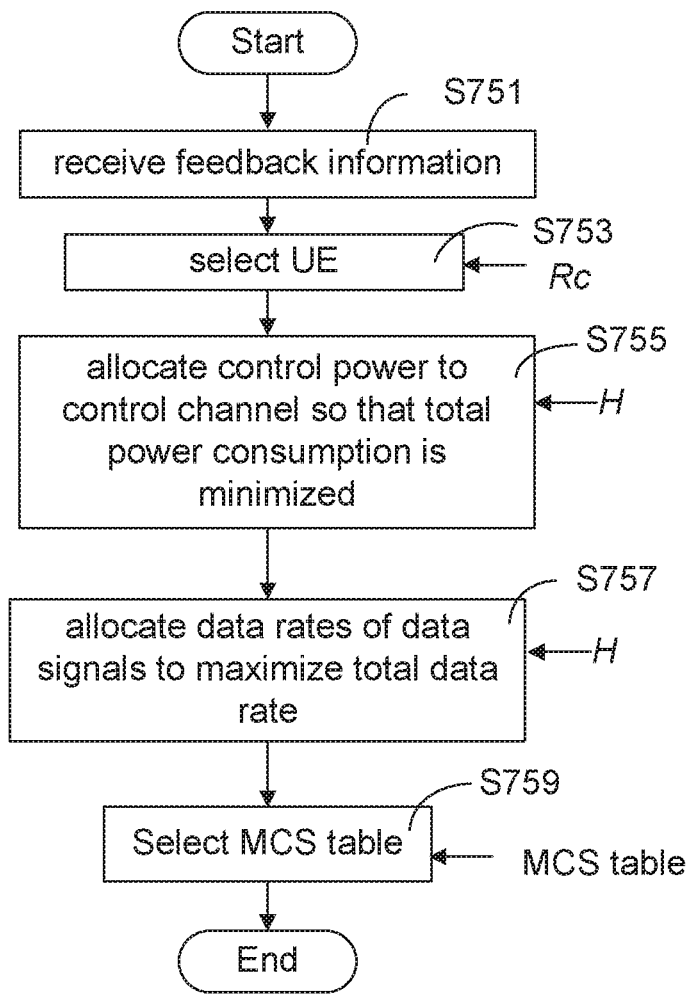
FIG. 17 is a schematic diagram illustrating a flow chart of the scheduler in accordance with an embodiment.

FIG. 17 is a schematic diagram illustrating a flow chart of the scheduler in accordance with an embodiment. The scheduler 75 could control the allocation of the resources being shared among the UEs in each time duration (symbol, slot, sub-frame etc.) and frequency band (sub-carrier, sub-carrier set etc.).

After the receiver receives feedback information from UEs (Step S751), the scheduler 75 firstly selects a set of UEs that satisfy the minimum requirement of coding rate of control channel ($R_C$) (step S753). The coding rate ($R_C$) means the minimum amount of coded bits of DCI could be reliably transmitted. The core process of the scheduler 75 may include two parts, the scheduling of the control channel and the scheduling of the data channel.

Figure 18A:
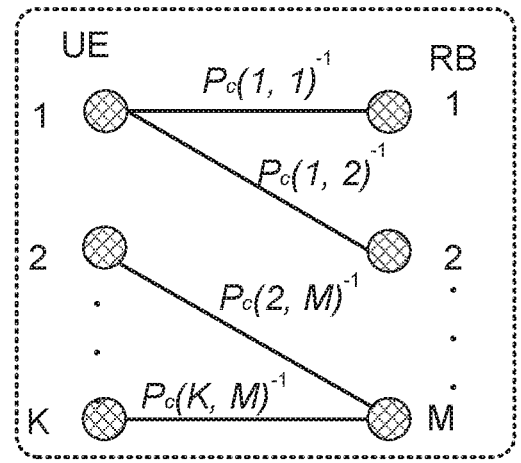
FIG. 18A is a schematic diagram illustrating how the question of allocating control power to control signal is mapped to a weighted bipartite graph in accordance with an embodiment.
Figure 18B:
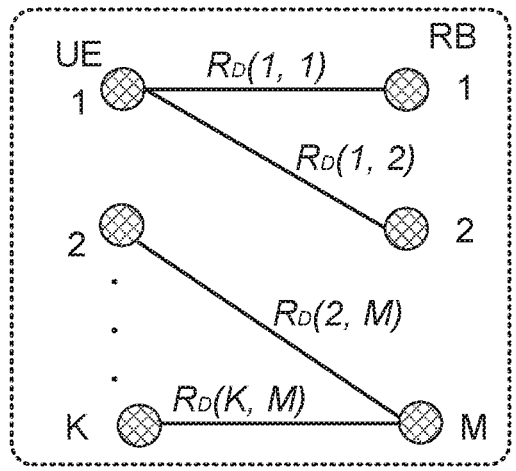
FIG. 18B is a schematic diagram illustrating how the question of allocating data power to data signal is mapped to a weighted bipartite graph in accordance with an embodiment.

The two issues of scheduling the control channel and the data channel, that is, to minimize total power consumption of control channel and to maximize total data rate of data channel, are both mapped to a maximum weighted perfect bipartite graph problem (see FIGS. 18A and 18B). In the weighted bipartite graph, two disjoint sets of vertex, $X=\{X_1, X_2, X_3\}$, and $Y=\{Y_1, Y_2, Y_3\}$ are connected by weighted edges. A matching is a set of pair wise non-adjacent edges which means no two edges share a common vertex. In the maximum weight matching problem, a nonnegative weight is assigned to each edge in order to find a perfect matching to maximize the total weight.

The reliability requirement for control channel is higher, and allocating sufficient power to the control channel is the critical concern. Furthermore, while scheduling the control channel, it may minimize power of all control channels in order to reserve more power for data channels. For control signals corresponding to the UEs, the scheduler respectively determines control power to be allocated to them to minimize a total power consumption under the constraint maintaining the minimum coding rate of control channel Rc (step S755). The results of step S755 are power to be allocated to the control signals of k-th UE on the $m_k$-th RB-pair which are denoted as $P_C(k,m_k)$, where $m_k$ is the RB-pair index allocated to k-th UE for transmitting control signal. Details about how control signals are scheduled by the scheduler could be referred to FIG. 18A.

On the other hand, higher throughput (total data rate) is desirable while scheduling the data signal. Thus in an embodiment, maximum of the total data rate for UEs is preferred while scheduling the data channel for UEs. Thus, the scheduler allocates data rates of a plurality of data signals in correspondence to UEs to maximize a total data rate (step S757). The data rate of the data signals corresponding to k-th UE on $m_k'$-th RB-pair(s) are denoted as $R_D(k,m_k')$ which could be changed by adjusting data power of data signals. Thus, after the data rate of UEs are determined, the power adjustment module 715 may accordingly adjust the data power of data signals. Details about how data signals are scheduled could be referred to FIG. 18B.

Finally, in step S759, the scheduler selects an appropriate modulation and coding scheme (hereinafter, MCS) according to a pre-configured MCS table. The MCS is selected for each UE with the consideration of data rate, $R_D(k,m_k')$. The channel information matrix of selected UEs is defined in equation (3), where the element $h_k(m)$ is the channel coefficient corresponding to k-th UE on mthRB-pair(s).

$$H = \begin{bmatrix} h_1(1) & \cdots & h_1(M) \\ \vdots & \ddots & \vdots \\ h_k(1) & \cdots & h_k(M) \end{bmatrix} \quad \text{equation (3)}$$

In FIGS. 18A and 18B, total number of UEs is represented as "K", and total number of available RB-pairs is represented as "M". In the following equations, "k" represents index of the UE, and "m" represents index of the RB-pair. The indexes of UEs (k) and the indexes of the RB-pairs (m) could be viewed as the disjoint vertexes in the bipartite graph. Therefore, the shading circles at the left column of FIGS. 18A and 18B are corresponding to UEs, and the shading circles at the right column of FIGS. 18A and 18B are corresponding to RB-pairs.

The k-th UE is corresponding to the k-th control signal and the k-th data signal. When the k-th control signal is multiplexed with different RB-pair, different control power is required. Because there are M RB-pairs, there are M types/selections of power could be allocated to the k-th control signal. Similarly, when the k-th data signal is transmitted with different RB-pair, different data rate is obtained. Because there are M RB-pairs, there are M selections of data rate available for the k-th data signal.

Therefore, the weight of the edges in FIG. 18A are the inverse of power to be allocated to control signals, and the weight of the edges in FIG. 18B are the data rate of the data signals. For example, $R_D(k,m)$ represents the data rate of data signal of the k-th UE if the m-th RB is used for multiplexing the k-th data signal.

FIG. 18A is a schematic diagram illustrating how the problem of allocating power to control signal is mapped to a weighted bipartite graph in accordance with an embodiment. FIG. 18A is corresponding to step S755 in FIG. 17.

For control signal of each UE, M RB-pairs (RB1, RB2, . . . RBM) could be selected to allocate the power. As the control signal of the UE may be multiplexed with different RB-pair, the power to be allocated to the control signal may change accordingly. If the first RB-pair (RB1) is selected to multiplex the control signal of UE1, the power to be allocated to the signal of UE1 is represented as $P_C(1, 1)$. If the second RB-pair (RB2) is selected to multiplex the control signal of UE1, the power to be allocated to the control signal of UE1 is represented as $P_C(1, 2)$ and so forth. In FIG. 18A, the power to be allocated to control signals of UEs in correspondence with RB-pairs are represented as weight between the vertexes.

While scheduling control channel, finding out the minimization of the total power to be allocated to control channel is the target. The maximum of inversed power to be allocated to the control channel implies that the total power to be allocated to the control channel is minimized. In following equations, $h_k(m)$ is the channel coefficient of k-th UE on the m-th RB-pair, $P_C(k, m)$ is the control power to be allocated to the control signal of the k-th UE if the control signal of the k-th UE is multiplexed with the m-th RB-pair, and $P_N$ is the noise power. Then, minimum of summation of the power to be allocated to control signal $P_C$ is acquired as equation (4). In addition, the power to be allocated to the control signal $P_C$ could also satisfy the requirement of coding rate $R_C$, that is, equation (5) could be satisfied.

$$\min_{m,k} \Sigma P_C(k,m) \quad \text{equation (4)}$$

$$R_C \leq \log_2\left(1 + \frac{\|h_k(m)\|^2 P_C(k,m)}{\|h_k(m)\|^2 (P - P_C(k,m)) + P_N}\right) \quad \text{equation (5)}$$

To minimize the total control power allocated to the control signals could be conducted as to maximize the summation of the inverse of the control power allocated to the control signals. That is, equation (4) could be further conducted as equation (6).

$$\max_{m,k} \Sigma P_C(k,m)^{-1} \quad \text{equation (6)}$$

With the vertexes and the weights shown in FIG. 18A, the question of allocating control signals could be mapped to problem of finding maximum weight match in a bipartite graph. To find the maximum weight match in the bipartite graph, different algorithms (for example, Hungarian algorithm) could be adopted.

FIG. 18B is a schematic diagram illustrating how the question of allocating the data power to data signal is mapped to a weighted bipartite graph in accordance with an embodiment. FIG. 18B is corresponding to step S757 in FIG. 17.

For data signal of each UE, M RB-pairs could be selected to allocate the data power. If the first RB-pair (RB1) is selected to allocate the data signal of UE1, data rate corresponding to the data signal of UE1 is represented as $R_D(1,$ 1). If the second RB-pair (RB2) is selected to allocate the data signal of UE1, data rate corresponding to the data signal of UE1 is represented as $R_D(1, 2)$ and so forth. The data rate corresponding to data signals of UEs in correspondence with RB-pairs are represented as weight between the vertexes in FIG. 18B. With the vertexes and the weights shown in FIG. 18B, the question of allocating the data power to data signals is similar to finding maximum weight match in a bipartite graph, and Hungarian algorithm could be adopted as well.

The data rate of data signal corresponding to the k-th UE on the m-th RB-pair is represented as $R_D(k,m)$ and could be calculated through equation (7).

$$R_D(k, m) = \log_2\left(1 + \frac{\|h_k(m)\|^2 P_D(k, m)}{\|h_k(m)\|^2 (P - P_D(k, m)) + P_N}\right) \quad \text{equation (7)}$$

The maximum data rate of data signal could be calculated according to equation (8). According to equation (7), the data rate of data signal is dependent on the data power of the data signal. Once the data rate of the data signals are determined, the data power could be accordingly adjusted to fulfill the required data rate.

$$\max_{m,k} \Sigma R_D(k,m) \quad \text{equation (8)}$$

In a case that the control signal of an i-th UE and data signal of a j-th UE are both multiplexed with an m-th RB-pair, summation of the data power allocated to the data signal of the j-th UE ($P_D(j, m)$) and the control power allocated to the control signal of the i-th UE ($P_C(i, m)$) could be less than or equal to a power constraint. In equation (9), summation of the data power to be allocated to the data signal of the j-th UE ($P_D(j, m)$) and the control power to be allocated to the control signal of the i-th UE ($P_C(i, m)$) is assumed to be equal to the power constraint P. When the variable "i" and the variable "j" are equivalent, the control signal and the data signal of a specific UE are both multiplexed with an identical RB-pair.

$$P_C(i,m) + P_D(j,m) = P \quad \text{equation (9)}$$

After that the control power and the data power to be allocated to control signals and data signals are determined, the control power of control signals and the data power of data signals are adjusted by the power adjustment modules 735, 715.

Figure 19A:
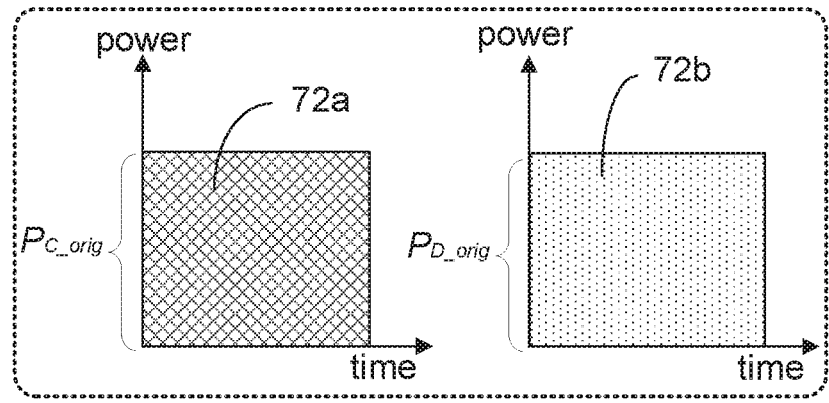
FIGS. 19A to 19C are schematic diagrams illustrating the process of superimposing control power and data power in accordance with an embodiment.

FIG. 19A represents original power levels of data signal $P_D$ and control signal $P_C$ in accordance with an embodiment. The original power of the control signal 72a is represented as $P_{C\_orig}$, and the original power of the data signal 72b is represented as $P_{D\_orig}$.

Figure 19B:
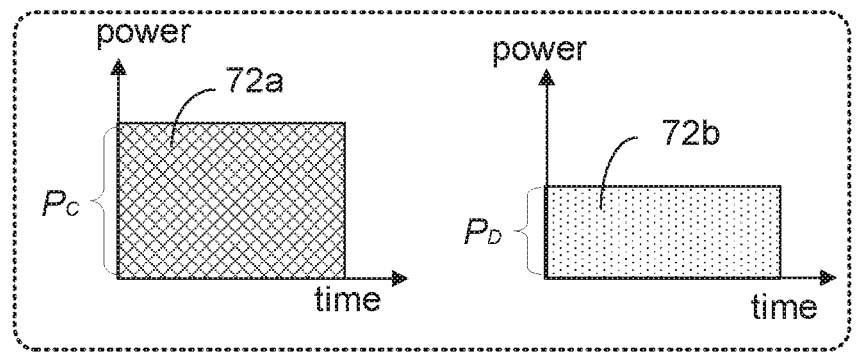

FIG. 19B illustrates how the data power of the data signal and the control power of the control signal could be adjusted in accordance with an embodiment. According to scheduling results of the scheduler, the power adjustment modules 735 adjusts the control power to be allocated to the control signal 72a from the original control power ($P_{C\_orig}$) to the adjusted control power ($P_C$); and the power adjustment modules 715 adjusts the data power to be allocated to the data signal 72b from the original data power ($P_{D\_orig}$) to the adjusted data power ($P_D$). Thus, the adjusted control power ($P_C$) is less than the original control power ($P_{C\_orig}$), and the adjusted data power ($P_D$) is less than the original data power ($P_{D\_orig}$). That is, $P_C < P_{C\_orig}$ and $P_D < P_{D\_orig}$.

Figure 19C:
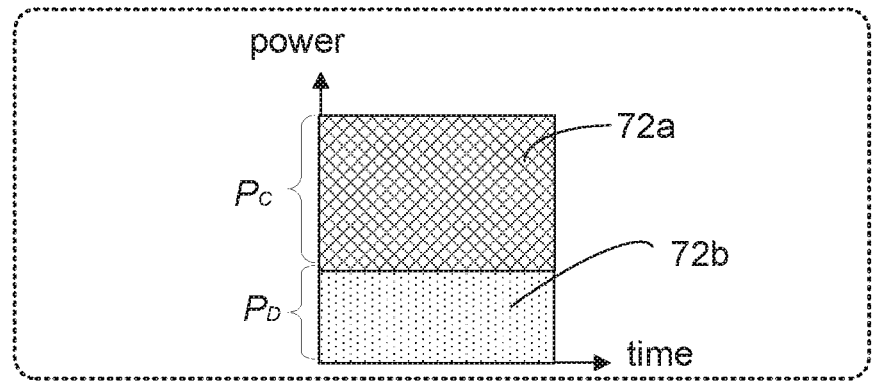

FIG. 19C shows how control signal and data signal are multiplexed by superimposing the adjusted control power and the adjusted data power in accordance with an embodiment. The control signal 72a and the data signal 72b are both multiplexed with an identical RB-pair by the resource mapping and multiplexing module 77. The adjusted control power ($P_C$) and the adjusted data power ($P_C$) are superimposed.

Figure 20:
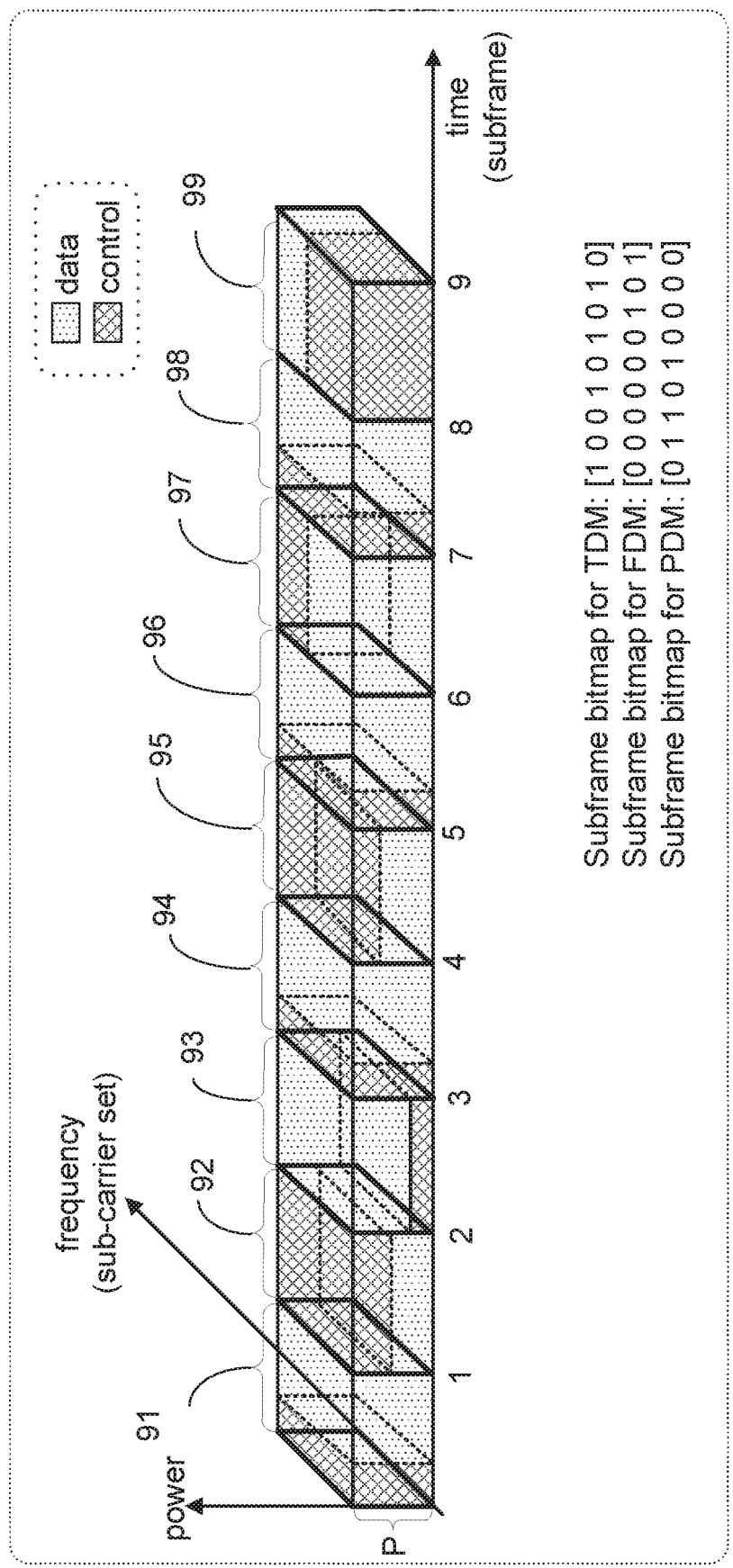
FIG. 20 is a schematic diagram illustrating the proposed multiplexing approach is integrated with conventional PDCCH and EPDCCH in accordance with an embodiment.

FIG. 20 is a schematic diagram illustrating the proposed multiplexing approach is integrated with conventional PDCCH and EPDCCH in accordance with an embodiment. The sub-frames 91, 92, 93, 94, 95, 96, 97, 98, and 99 are sequentially ordered along the time axis, and three bitmaps could be used for indicating how control signals and data signals are multiplexed in units of RB-pair. According to the embodiment of the present disclosure, the base station may alternately selects any of time division multiplexing (hereinafter, TDM), frequency division multiplexing (hereinafter, FDM), or PDM for control signals and data signals in different RB-pairs. A bitmap is with size equal to the number of RB-pairs in the cell bandwidth. When TDM is performed to an RB-pair, the time duration of the control channel is less than the time duration of the data channel. When FDM is performed to an RB-pair, the time duration of the control channel and the data channel are substantially equivalent. In either TDM or FDM, the control power of the control signal and the data power of the data signal are substantially equivalent. In addition, both the control power and the data power are less than or equal to the power constraint (P).

A TDM bitmap is used for recording RB-pairs which are multiplexed according to PDCCH, an FDM bitmap is used for recording RB-pairs which are multiplexed according to EPDCCH, and a PDM bitmap is used for recording RB-pairs which are multiplexed according to the present disclosure. As shown in FIG. 20, a sequence of {1, 0, 0, 1, 0, 1, 0, 1, 0} is recorded in the TDM bitmap to indicate that the control signal and the data signal on the first, the fourth, the sixth, and the eighth RB-pairs are multiplexed by TDM manner. A sequence of {0, 0, 0, 0, 0, 0, 1, 0, 1} is recorded in the FDM bitmap to indicate that the control signal and the data signal on the seventh and the ninth RB-pairs are multiplexed by FDM manner. A sequence of {0, 1, 1, 0, 1, 0, 0, 0, 0} is recorded in the PDM bitmap to indicate that the control signal and the data signal on the second, the third, and the fifth RB-pairs are multiplexed by PDM manner. Please note that other notations for indicating multiplex types are not precluded.

The RB-pairs are used as a unit for power allocation in the above embodiments. However, in some applications, RE may be selected as the basic unit for PDM.

Figure 21A:
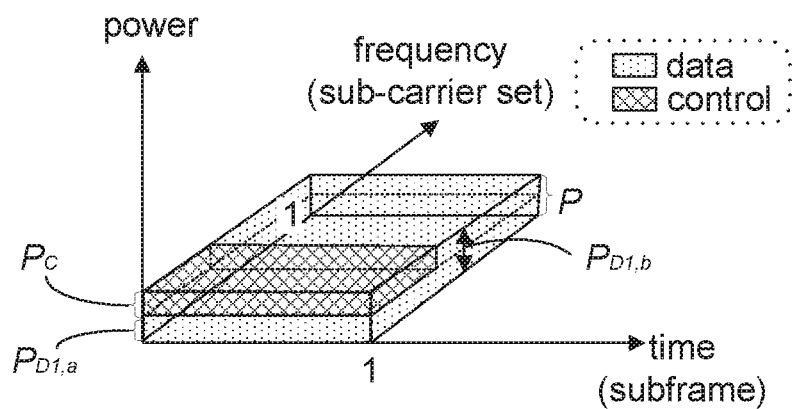
FIG. 21A is a schematic diagram illustrating that only REs with low frequency sub-carriers are used for multiplexing both the control signal and the data signal in accordance with an embodiment.

FIG. 21A is a schematic diagram illustrating that only REs with low frequency sub-carriers are used for multiplexing both the control signal and the data signal in accordance with an embodiment. In FIG. 21A, the control signal 911a is transmitted only with the lower sub-carriers in the subframe, but the data signal 911b is transmitted with all sub-carriers in the subframe.

Figure 21B:
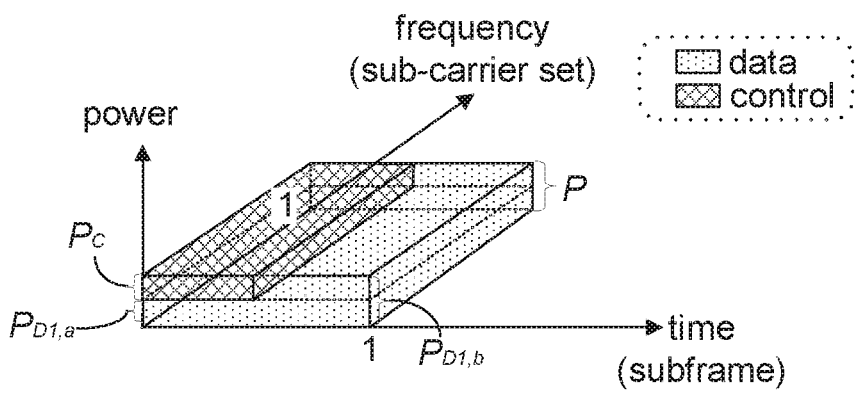
FIG. 21B is a schematic diagram illustrating that only REs in a time duration shorter than a subframe are used for multiplexing both the control signal and the data signal in accordance with an embodiment.

FIG. 21B is a schematic diagram illustrating that only REs in a time duration shorter than a subframe are used for multiplexing both the control signal and the data signal in accordance with an embodiment. In FIG. 21B, the control signal 912a is transmitted only in a time duration shorter than the subframe, but the data signal 911b is transmitted in whole subframe.

In FIGS. 21A and 21B, the control power is maintained as $P_C$. Furthermore, the data power ($P_{D1,a}$) allocated to REs for multiplexing both the control and the data signals is less than the data power ($P_{D1,b}$) allocated to the REs for multiplexing only the data signals. As shown in FIGS. 21A and 21B, the scheduler may dynamically adjust the control power and the data power in variation of the sub-carriers and time duration. If the number of REs being multiplexed with control signals becomes less, more REs could be reserved for data signals. Consequentially, the total data rate could be increased.

According to the present disclosure, scheduling in LTE could take channel variations into account not only in the time domain and the frequency domain, but also in the power domain. By multiplexing control channel and data channel in the power domain, allocation of radio resources becomes more flexible. The control channel and data channel are multiplexed in the power-domain at the transmitter and channel separation process is provided by the receiver. Consequentially, control channel capacity and data transmission efficiency could be improved, and the capacity of downlink channel is optimized.

The above embodiments could be further applied to different scenarios. For example, the present disclosure could be applied to multicast, broadcast or uni-cast applications, and the number of antennas is not limited. While the disclosure herein mainly discusses LTE systems, the concepts are equally applicable to other wireless communication systems as well. Moreover, while LTE terminology such as PDCCH, EPDCCH, PDSCH, DCI etc. are used to facilitate the description, such terms are to be broadly interpreted when the embodiments described herein are applied to other wireless communication systems.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A method for transmitting signals applied to an access node, comprising:
   allocating a power of a first control signal to be transmitted with a first sub-carrier in a frequency domain in a first time duration;
   allocating a power of a first data signal to be transmitted with the first sub-carrier in the first time duration, wherein the power of the first control signal and the power of the first data signal are different;
   superimposing, in a power domain, the power of the first control signal and the power of the first data signal on the first sub-carrier and the first time duration to multiplex, by power division multiplexing, the first control signal and the first data signal which are transmitted from the access node to at least one user equipment;
   transmitting the first control signal and the first data signal, which are multiplexed, with the first sub-carrier in the first time duration;
   allocating a power of a second control signal to be transmitted with the first sub-carrier in a second time duration;
   allocating a power of a second data signal to be transmitted with the first sub-carrier in the second time duration, wherein the power of the second control signal and the power of the second data signal are different;
   superimposing, in the power domain, the power of the second control signal and the power of the second data signal on the first sub-carrier and the second time duration to multiplex, by power division multiplexing, the second control signal and the second data signal, which are transmitted from the access node to the at least one user equipment; and
   transmitting the second control signal and the second data signal, which are multiplexed, with the first sub-carrier in the second time duration;
   wherein the first control signal and the second data signal correspond to one user equipment of the at least one user equipment.

2. The method for transmitting signals according to claim 1, further comprising:
   transmitting a reference signal indicating the power of the first control signal.

3. The method for transmitting signals according to claim 2, wherein the power of the first control signal is equivalent to the power of the reference signal.

4. The method for transmitting signals according to claim 1, further comprising:
   determining the power of the first control signal and the power of the second control signal.

5. The method for transmitting signals according to claim 1, further comprising:
   determining a first data rate corresponding to the first data signal and a second data rate corresponding to the second data signal, wherein a total data rate comprising the first data rate and the second data rate is maximized, and the power of the first data signal and the power of the second data signal are respectively determined according to the first data rate and the second data rate.

6. The method for transmitting signals according to claim 1, further comprising:
   allocating a power of a third control signal to be transmitted with a second sub-carrier in the frequency domain in the first time duration;
   allocating a power of a third data signal to be transmitted with the second sub-carrier in the first time duration; and
   superimposing the power of the third control signal and the power of the third data signal on the second sub-carrier and the first time duration to multiplex in the power domain the third control signal and the third data signal which are transmitted from the access node to the at least one user equipment.

7. The method for transmitting signals according to claim 1, wherein a fourth control signal is transmitted from the access node to the at least one user equipment, and the method further comprises:
   allocating a power of the fourth control signal to be transmitted with the first sub-carrier in the first time duration, wherein a summation of the power of the first control signal, the power of the first data signal and the power of the fourth control signal is less than or equivalent to a power constraint.

8. The method for transmitting signals according to claim 1, wherein a fourth data signal is transmitted from the access node to the at least one user equipment, and the method further comprises:
   allocating a power of the fourth data signal to be transmitted with the first sub-carrier in the first time duration, wherein a summation of the power of the first control signal, the power of the first data signal and the power of the fourth data signal is less than or equivalent to a power constraint.

9. A transmitter of an access node for transmitting signals, comprising:
   a scheduler, configured to determine a power the of a first control signal and a power of a first data signal, wherein the first control signal and the first data signal are to be transmitted with a first sub-carrier in a frequency domain in a first time duration, and the power of the first control signal and the power of the first data signal are different;
a processor, operatively coupled to the scheduler, configured to adjust a transmission power according to control of the scheduler, wherein the processor is further configured to superimpose, in a power domain, the power of the first control signal and the power of the first data signal on the first sub-carrier and the first time duration to multiplex, by power division multiplexing, the first control signal and the first data signal which are transmitted from the access node to at least one user equipment; and
a transmitting circuit, configured to transmit the first control signal and the first data signal, which are multiplexed, with the first sub-carrier in the first time duration;
wherein the scheduler allocates a power of the second control signal and allocates a power of the second data signal, the second control signal and the second data signal are to be transmitted with the first sub-carrier in a second time duration, and the power of the second control signal and the power of the second data signal are different;
the processor superimposes, in the power domain, the power of the second control signal and the power of the second data signal on the first sub-carrier and the second time duration to multiplex, by power division multiplexing, the second control signal and the second data signal which are transmitted from the access node to the at least one user equipment; and
the first control signal and the second data signal correspond to one user equipment of the at least one user equipment.

10. The transmitter according to claim 9, wherein the transmitting circuit further transmits a reference signal to indicate the power of the first control signal.

11. The transmitter according to claim 10, wherein the power of the first control signal is equivalent to the power of the reference signal.

12. The transmitter according to claim 9, wherein the power of the first control signal and the power of the second control signal are determined.

13. The transmitter according to claim 9, wherein
a first data rate corresponding to the first data signal and a second data rate corresponding to the second data signal are determined, a total data rate comprising the first data rate and the second data rate is maximized, and the power of the first data signal and the power of the second data signal are respectively determined according to the first data rate and the second data rate.

14. The transmitter according to claim 9, wherein the scheduler determines a power of the third control signal and a power of the third data signal, the third control signal and the third data signal are to be transmitted with a second sub-carrier in the frequency domain in the first time duration, and the power of the third control signal and the power of the third data signal are different; and
the processor superimposes, in the power domain, the power of the third control signal and the power of the third data signal on the second sub-carrier and the first time duration to multiplex, by power division multiplexing, the third control signal and the third data signal which are transmitted from the access node to the at least one user equipment.

15. The transmitter according to claim 9, wherein
a fourth control signal is transmitted from the access node to the at least one user equipment;
the scheduler determines a power of the fourth control signal to be transmitted with the first sub-carrier in the first time duration, and a summation of the power of the first control signal, the power of the first data signal and the power of the fourth signal control is less than or equivalent to a power constraint.

16. The transmitter according to claim 9, wherein
a fourth data signal is transmitted from the access node to the at least one user equipment;
the scheduler determines a power of the fourth data signal to be transmitted with the first sub-carrier in the first time duration, and a summation of the power of the first control signal, the power of the first data signal and the power of the fourth data signal is less than or equivalent to a power constraint.

* * * * *